US012652142B2

(12) United States Patent
Matsumura et al.

(10) Patent No.: US 12,652,142 B2
(45) Date of Patent: Jun. 9, 2026

(54) TERMINAL, COMMUNICATION METHOD, BASE STATION, AND SYSTEM FOR CONFIGURATION DOWNLINK CONTROL CHANNEL CANDIDATES LINKED WITH ONE ANOTHER

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 327 days.

(21) Appl. No.: 18/553,418

(22) PCT Filed: Mar. 31, 2021

(86) PCT No.: PCT/JP2021/014062
§ 371 (c)(1),
(2) Date: Sep. 29, 2023

(87) PCT Pub. No.: WO2022/208820
PCT Pub. Date: Oct. 6, 2022

(65) Prior Publication Data
US 2024/0195577 A1     Jun. 13, 2024

(51) Int. Cl.
*H04W 72/23* (2023.01)
*H04L 5/00* (2006.01)
*H04W 72/232* (2023.01)
(52) U.S. Cl.
CPC ......... *H04L 5/0053* (2013.01); *H04W 72/232* (2023.01)

(58) Field of Classification Search
CPC ............... H04W 72/231; H04W 72/23; H04W 72/1263; H04W 72/0446; H04W 72/232;
(Continued)

(56) References Cited

U.S. PATENT DOCUMENTS

| | | | |
|---|---|---|---|
| 2019/0174466 A1* | 6/2019 | Zhang | H04L 5/0057 |
| 2023/0199787 A1* | 6/2023 | Cirik | H04L 5/001 |
| 2023/0224916 A1* | 7/2023 | Cirik | H04W 74/08 |
| | | | 370/329 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).
(Continued)

*Primary Examiner* — Wei Zhao
(74) *Attorney, Agent, or Firm* — Osha Bergman Watanabe & Burton LLP

(57) ABSTRACT

A terminal according to one aspect of the present disclosure includes: a receiving section that receives a configuration for two physical downlink control channel (PDCCH) candidates linked with each other; and a control section that uses, when downlink control information transmitted by using the two PDCCH candidates corresponds to a reference PDCCH candidate of the two PDCCH candidates, the downlink control information for uplink control channel resource determination. According to one aspect of the present disclosure, it is possible to support PDCCH repetition transmission appropriately.

5 Claims, 22 Drawing Sheets

(58) Field of Classification Search
CPC .... H04W 52/02; H04W 72/12; H04L 5/0053;
H04L 1/1819; H04L 5/005
See application file for complete search history.

(56) References Cited

OTHER PUBLICATIONS

International Search Report issued in PCT/JP2021/014062 on Oct.
26, 2021 (3 pages).
Written Opinion of the International Searching Authority issued in
PCT/JP2021/014062 on Oct. 26, 2021 (3 pages).
ZTE; "Enhancements on Multi-TRP for PDCCH, PUCCH and
PUSCH"; 3GPP TSG RAN WG1 Meeting #104-e, R1-2100286;
e-Meeting; Jan. 25-Feb. 5, 2021 (26 pages).
MediaTek Inc.; "R16 maintenance of multi-TRP operation"; 3GPP
TSG RAN WG1 Meeting #101-e, R1-2003660; Online; May 25-29,
2020 (12 pages).

* cited by examiner

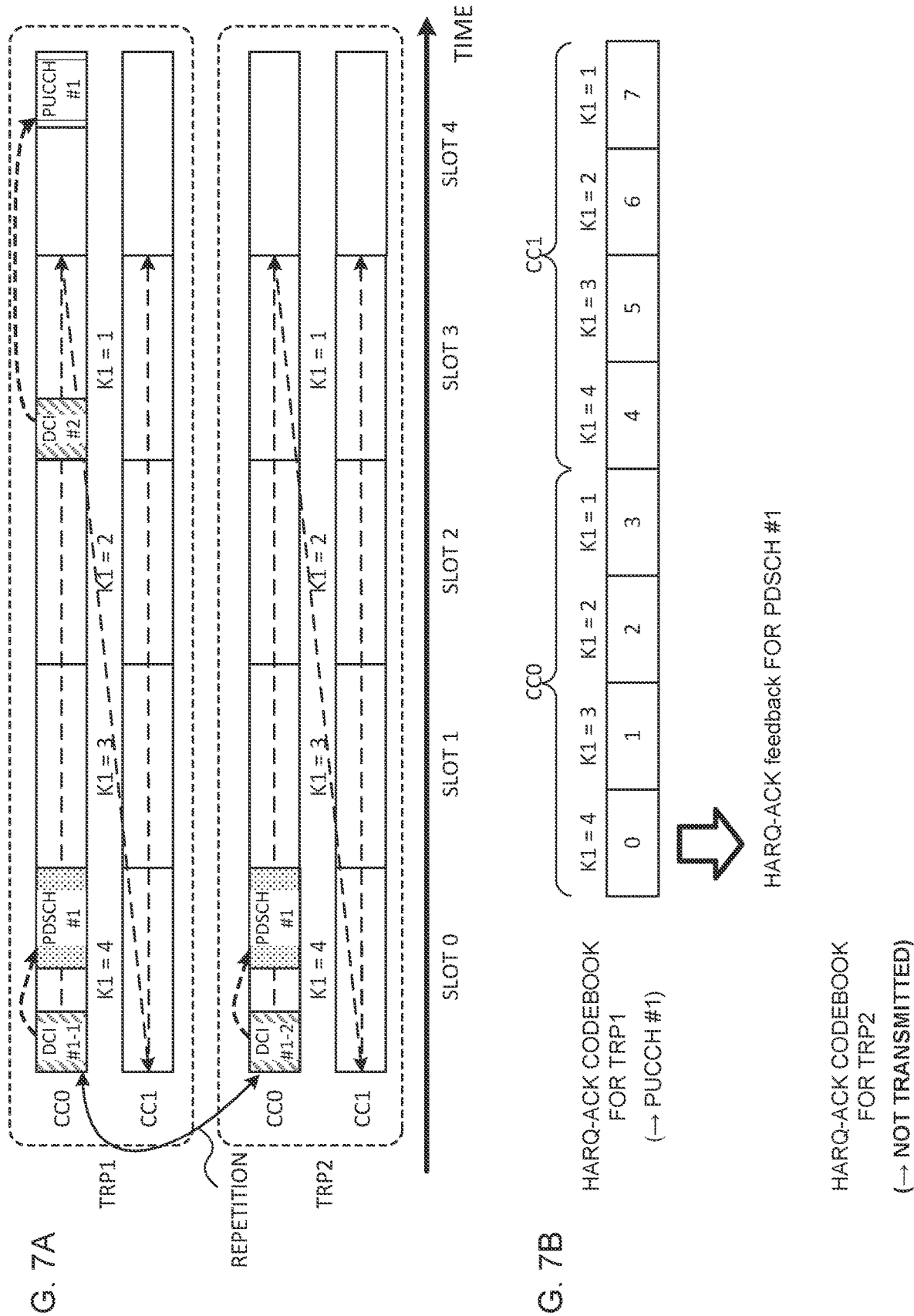

FIG. 11

TERMINAL, COMMUNICATION METHOD, BASE STATION, AND SYSTEM FOR CONFIGURATION DOWNLINK CONTROL CHANNEL CANDIDATES LINKED WITH ONE ANOTHER

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems, repetition of a physical downlink control channel (PDCCH) is studied.

However, study about how to perform Hybrid Automatic Repeat reQuest ACKnowledgement (HARQ-ACK) feedback (for example, contents of an HARQ-ACK codebook and a resource for transmitting an HARQ-ACK) for such PDCCH repetition has not been advanced yet.

Unless these are defined clearly, HARQ-ACK feedback cannot be appropriately performed in a case of employing PDCCH repetition transmission, which may decrease throughput or degrade communication quality.

Thus, an object of the present disclosure is to provide a terminal, a radio communication method, and a base station that can appropriately support PDCCH repetition transmission.

Solution to Problem

A terminal according to one aspect of the present disclosure includes: a receiving section that receives a configuration for two physical downlink control channel (PDCCH) candidates linked with each other; and a control section that uses, when downlink control information transmitted by using the two PDCCH candidates corresponds to a reference PDCCH candidate of the two PDCCH candidates, the downlink control information for uplink control channel resource determination.

Advantageous Effects of Invention

According to one aspect of the present disclosure, it is possible to support PDCCH repetition transmission appropriately.

BRIEF DESCRIPTION OF DRAWINGS

FIGS. 7A and 7B are diagrams to show another variation of (2-0) above.

FIG. 11 is a diagram to show an example of the numbering of DAIs in the third embodiment.

Figure 1:
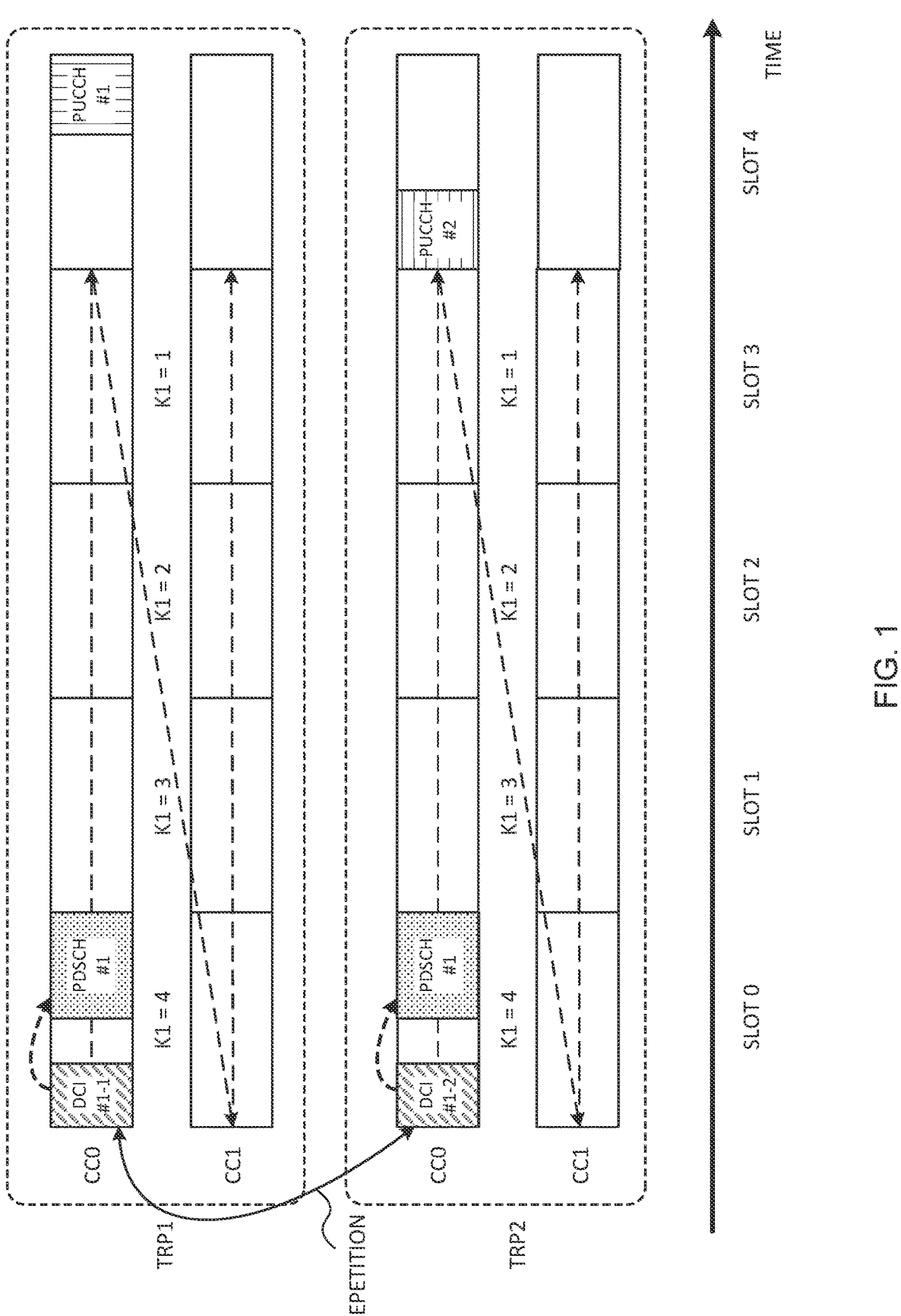
FIG. 1 is a diagram to show an example of a case where two linked CORESETs are provided by using different CORESET pool indices.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter (s) (or parameter set (s)) that can be assumed to be the same, and such parameter (s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

Note that, in the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that a channel/signal being a target of application of a TCI state may be referred to as a target channel/reference signal (RS) or simply as a target, and another signal described above may be referred to as a reference signal (reference RS) and a source RS or simply as a reference.

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a reference signal for demodulation (DeModulation Reference Signal (DMRS), and the like).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

(Multi-TRP)

For NR, it is studied that one or a plurality of transmission/reception points (TRPs) (multi-TRP (MTRP)) perform DL transmission to a UE. It is also studied that the UE performs UL transmission to the one or plurality of TRPs.

The UE may assume that, in an active downlink Bandwidth Part (BWP) of a given serving cell, when a CORESET pool index (indices) (higher layer parameter (s) CORESET-PoolIndex) is not provided or a CORESET pool index value=0 is provided for one or more first CORESETs and a CORESET pool index value=1 is provided for one or more second CORESET (s), multi-DCI based multi-TRP is used (control based on multi-DCI based multi-TRP is performed).

In Rel. 17 or later versions, it is also assumed that repetition transmission is applied to a PDCCH (or DCI) transmitted from one or more TRPs (PDCCH repetition). For example, it is considered that a plurality of PDCCHs (or DCIs) transmitted from one or more TRPs are used to perform scheduling or transmission/reception indication of one or more signals/channels.

The PDCCHs/DCIs to which repetition transmission is applied may be referred to as multi-PDCCH/multi-DCI/multi-TRP PDCCH. PDCCH repetition transmission may be interpreted as PDCCH repetition, a plurality of PDCCH transmissions, multi-PDCCH transmission, multi-TRP PDCCH repetition, MTRP PDCCH, and the like, and vice versa.

Multi-PDCCH/multi-DCI may be transmitted from respective different TRPs (in other words, CORESETs corresponding to different CORESET pool indices). The multi-PDCCH/multi-DCI may be multiplexed by using time division multiplexing (TDM)/frequency division multiplexing (FDM)/space division multiplexing (SDM).

For example, when PDCCH repetition is performed by using TDM (TDM PDCCH repetition), PDCCHs may be transmitted from a plurality of TRPs by using different time resources.

When FDM PDCCH repetition is performed, PDCCHs may be transmitted from a plurality of TRPs by using different frequency time resources. In the FDM PDCCH repetition, at least one of two sets of resource element groups (REGs), a control channel elements (CCEs) of the transmitted PDCCHs, two transmitted PDCCH repetitions not overlapping in terms of frequency, and transmitted multi-chance PDCCHs not overlapping in terms of frequency may be related to different TCI states.

When SDM PDCCH repetition is performed, PDCCHs may be transmitted from a plurality of TRPs by using the same time/frequency resource. In the SDM PDCCH repetition, PDCCH DMRSs in all the REGs/CCEs of the PDCCHs may be related to two TCI states. Note that, in the present disclosure, SDM and a single frequency network (SFN) may be interchangeably interpreted.

For NR of Rel. 17 or later versions, control satisfying the following is studied for reliability of non-SFN based multi-TRP PDCCH:

In coding/rate matching, the same coded bits are repeated, based on one repetition, in another repetition. The repetitions have the same number of control channel elements (CCEs) and the same number of coded bits, and correspond to the same DCI payload.

Two or more PDCCH candidates are explicitly linked with each other. The UE knows the link before decoding.

To enable PDCCH transmission with two TCI states, two search space (SS) sets are associated with two respective CORESETs.

Here, the two or more PDCCH candidates are included in the two SS sets (two CORESETs).

Note that linking (association) of the two SS sets may be configured/activated/notified for the UE by higher layer signaling. When PDCCH repetition is monitored in the two linked SS sets, the UE does not expect that a still another (third) monitored SS set is linked with at least one of the two linked SS sets.

The two linked SS sets may be configured to have the same SS set type (for example, a common SS, a UE-specific SS) to monitor the same DCI format.

For intra-PDCCH repetition, the two linked SS sets may have the same periodicity and offset and the same duration. Linked monitoring occasions over the two SS sets may be present in the same slot. In the slot, the two sets may have the same number of monitoring occasions, and the n-th (n is an integer) monitoring occasion of one of the SS sets may be linked with the n-th monitoring occasion of the other SS set.

Note that two PDCCH candidates in the two SS sets may be linked with each other, based on having the same aggregation level (AL) and the same candidate index. The two linked SS sets may be configured to have the same number of PDCCH candidates for each AL.

(HARQ-ACKs of Multi-TRP)

As Hybrid Automatic Repeat reQuest ACKnowledgement (HARQ-ACK) feedback for multi-PDSCH, separate HARQ-ACK feedback and joint HARQ-ACK feedback are studied. In the present disclosure, "separate" may be interpreted as "independent" and vice versa. Separate HARQ-ACK feedback (which may be referred to as separate feedback and separate HARQ-ACK) correspond to feedback in which the UE transmits, for each TRP, an HARQ-ACK in a separate uplink control channel (Physical Uplink Control Channel (PUCCH))/uplink shared channel (Physical Uplink Shared Channel (PUSCH)) resource. The plurality of PUCCH/PUSCH resources may overlap (may be transmitted simultaneously) but need not overlap (for example, may be TDMed/FDMed).

By using the separate HARQ-ACK, independent HARQ-ACK transmission for each TRP is possible. Even when backhaul delay between TRPs is large (for example, TRPs are connected via non-ideal backhaul (non ideal backhaul)), this does not increase HARQ delay.

The joint HARQ-ACK feedback (which may be referred to as joint feedback, joint HARQ-ACK, and the like) correspond to feedback in which the UE transmits HARQ-ACKs of a plurality of TRPs together in the same PUCCH/PUSCH resource.

By using the joint HARQ-ACK, one PUCCH/PUSCH transmission is sufficient, which can reduce resource overhead. When backhaul delay between TRPs is little (for example, TRPs are connected via ideal backhaul), this can deliver an HARQ-ACK transmitted to one of the TRPs, to the other TRP with little delay.

In Rel-16 NR, the UE may be configured with a feedback mode by a higher layer parameter indicating whether a feedback mode to be used in one slot is joint feedback or separate feedback (which may be referred to as "ackNack-FeedbackMode," "ackNackFeedbackMode-r16," ACKNACK feedback mode, and the like).

One or a plurality of DCIs for scheduling multi-PDSCH may include a field for PUCCH resource indicators (PRIs). The PRIS each correspond to information for indicating a resource for transmitting an HARQ-ACK corresponding to each PDSCH and may be referred to as an ACK/NACK resource indicator (ARI).

The UE may judge PUCCH resources for transmitting HARQ-ACKs corresponding to the multi-PDSCH, based on the PRIs.

(HARQ-ACK Codebook)

In NR, the UE may transmit HARQ-ACK feedback by using one PUCCH resource in units of HARQ-ACK codebook constituted by bits of one or more transmission confirmation information (for example, Hybrid Automatic Repeat reQuest ACKnowledgement (HARQ-ACK)). The HARQ-ACK bits may be referred to as HARQ-ACK information, HARQ-ACK information bits, and the like.

Here, the HARQ-ACK codebook may be constituted by including bits for HARQ-ACK in units of at least one of time domain (for example, slot), frequency domain (for example, component carrier (CC)), space domain (for example, layer), transport block (TB), and code block group (CBG) constituting a TB. The HARQ-ACK codebook may simply be referred to as a codebook.

Note that the number of bits (size) and the like included in the HARQ-ACK codebook may be determined semi-statistically or dynamically. An HARQ-ACK codebook for which the size is determined semi-statically may be referred to as a semi-static HARQ-ACK codebook, type-1 HARQ-ACK codebook, and the like. An HARQ-ACK codebook for which the size is determined dynamically may be referred to as a dynamic HARQ-ACK codebook, type-2 HARQ-ACK codebook, and the like.

Which one of type-1 HARQ-ACK codebook and type-2 HARQ-ACK codebook is to be used may be configured for the UE by using a higher layer parameter (for example, pdsch-HARQ-ACK-Codebook).

In a case of type-1 HARQ-ACK codebook, the UE may feed back, in a given range (for example, a range configured based on a higher layer parameter), an HARQ-ACK bit (s) corresponding to a PDSCH candidate (s) (or a PDSCH occasion (s)) corresponding to the range irrespective of presence/absence of scheduling of a PDSCH (s).

The range may be determined based on at least one of a period (for example, a set of a given number of occasions for candidate PDSCH reception or a given number of PDCCH monitoring occasions), the number of CCs configured or activated for the UE, the number of TBs (the number of layers or ranks), the number of CBGs per TB, and presence/absence of application of spatial bundling. The range may be referred to as an HARQ-ACK window, an HARQ-ACK bundling window, an HARQ-ACK feedback window, and the like.

In type-1 HARQ-ACK codebook, even when there is no scheduling of a PDSCH for the UE, the UE reserves a bit for the PDSCH in the codebook as long as being in the range. When the UE judges that the PDSCH is not scheduled in actual, the UE can feed back the bit as a NACK bit.

In contrast, in a case of type-2 HARQ-ACK codebook, the UE may feed back an HARQ-ACK bit (s) for a scheduled PDSCH (s) in the range.

Concretely, the UE may determine the number of bits of type-2 HARQ-ACK codebook, based on a field in DCI (for example, a DL assignment index (Downlink Assignment Indicator (Index) (DAI) field). The DAI field may include a counter DAI (C-DAI) and a total DAI (T-DAI).

The C-DAI may indicate a counter value of downlink transmission (PDSCH, data, TB) scheduled in a given period. For example, the C-DAI in DCI for scheduling data in the period may indicate the number counted in the frequency domain (for example, CC) first and then in the time domain in the period. For example, the C-DAI may correspond to a value obtained by counting PDSCH reception or semi-persistent scheduling (SPS) release in ascending order of service cell indices and then ascending order of PDCCH monitoring occasions for one or more DCIs included in the period.

In other words, the C-DAI may mean the accumulated number of pairs {serving cell, PDCCH monitoring occasion} corresponding to respective data up to the current serving cell and the current PDCCH monitoring occasion.

The T-DAI may indicate the total value (the total number) of data scheduled in a given period. For example, the T-DAI in DCI for scheduling data in a given time unit (for example, PDCCH monitoring occasion) in the period may indicate the total number of data scheduled up to the time unit (also referred to as a point, timing, and the like) in the period.

In other words, the T-DAI may mean the total number of pairs {serving cell, PDCCH monitoring occasion} corresponding to respective data up to the current PDCCH monitoring occasion and a value updated for each PDCCH monitoring occasion.

In Rel-16 NR studied heretofore, CORESETs having different CORESET pool indices are used to schedule respective different PDSCHs (multi-DCI based multi-TRP).

For this reason, in Rel-16 NR, it is defined that, when the first CORESET and the second CORESET described above are configured, and also separate feedback is configured ("ackNackFeedbackMode-r16"="separate" is configured), for the UE, the UE separately performs generation/report of HARQ-ACK information related to the first CORESET and generation/report of HARQ-ACK information related to the second CORESET for type-1 and type-2 HARQ-ACK codebooks.

Note that, in the present disclosure, a "first TRP," "TRP1," a "first CORESET," a "CORESET for which no CORESET pool index is provided or CORESET pool index value=0 is provided" may be interpreted interchangeably. The "first CORESET" may mean one or a plurality of first CORESETs.

Note that, in the present disclosure, a "second TRP," "TRP2," a "second CORESET," a "CORESET for which CORESET pool index value=1 is provided" may be interpreted interchangeably. The "second CORESET" may mean one or a plurality of second CORESETs.

Meanwhile, the two CORESETs related to the two linked SS sets described above (also referred to as "two linked CORESETs for PDCCH repetition" in the present disclosure) are used for repetition transmission of DCIs with the same payload. In other words, the two linked CORESETs may be used for scheduling the same one PDSCH.

Hence, there is a problem about for which TRP each HARQ-ACK for PDSCHs scheduled by the two linked CORESETs is. In other words, study has not been advanced yet regarding, when two linked CORESETs are provided by using different CORESET pool indices for PDCCH repetition, which HARQ-ACK to generate, which resource to use for transmission of the HARQ-ACK, and the like for each PDSCH scheduled by DCIs transmitted in two linked PDCCH candidates in the two linked CORESETs.

Unless these are defined clearly, HARQ-ACK feedback cannot be appropriately performed in a case of employing multi-TRP PDCCH repetition transmission, which may decrease throughput or degrade communication quality.

Thus, the inventors of the present invention came up with the idea of a method for preferably performing uplink (for example, PUCCH/PUSCH) transmission for PDCCH repetition transmission.

Embodiments according to the present disclosure will be described in detail with reference to the drawings as follows. The radio communication methods according to respective embodiments may each be employed individually, or may be employed in combination.

Note that in the present disclosure, "A/B" may mean "at least one of A and B."

In the present disclosure, activate, deactivate, indicate, select, configure, update, determine, and the like may be interchangeably interpreted.

In the present disclosure, RRC, an RRC parameter, an RRC message, a higher layer parameter, an information element (IE), and a configuration may be interchangeably interpreted. In the present disclosure, a MAC CE, an update command, and an activation/deactivation command may be interchangeably interpreted. In the present disclosure, "support," "control," "controllable," "operate," and "operable" may be interchangeably interpreted.

In the present disclosure, a sequence, a list, a set, a group, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, or a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state, and the like may be interchangeably interpreted.

The Panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, it may be assumed that a single PDCCH is supported when multi-TRP uses ideal backhaul. It may be assumed that multi-PDCCH is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. Terms are not limited to these.

In the present disclosure, multi-TRP, multi-TRP system, multi-TRP transmission, and multi-PDSCH may be interchangeably interpreted.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as QCL type D.

Each embodiment may be applied to a case where multi-DCI based multi-TRP is used.

Each embodiment will be described by assuming a case where a CORESET pool index (indices) (higher layer parameter (s) CORESETPoolIndex) is not provided or a CORESET pool index value=0 is provided for one or more first CORESETs and a CORESET pool index value=1 is provided for one or more second CORESET (s) and where separate feedback is configured ("ackNackFeedbackMode-r16"="separate" is configured), but this is not restrictive. (Radio Communication Method)

First Embodiment

A first embodiment relates to whether two linked CORESETs are provided for PDCCH repetition by using different CORESET pool indices in a case where separate feedback is configured ("ackNackFeedbackMode-r16"="separate" is configured).

The first embodiment can be broadly classified into two as follows:

(Embodiment 1.1) A UE does not expect that two linked CORESETs are provided for PDCCH repetition by using different CORESET pool indices.

(Embodiment 1.2) The UE may expect that the two linked CORESETs are provided for PDCCH repetition by using the same or different CORESET pool indices.

In Embodiment 1.1, the UE may expect that the two linked CORESETs are provided for PDCCH repetition by using the same CORESET pool index.

In Embodiment 1.1, when one of the two linked CORESETs is configured with a CORESET pool index while the other is not configured with a CORESET pool index, the UE may assume that the two linked CORESETs are configured with the same CORESET pool index.

For Embodiment 1.1, the UE may always generate one HARQ-ACK for one TRP for one PDSCH. For Embodiment 1.2, whether the UE generates two HARQ-ACKs for two TRPs for one PDSCH scheduled by DCIs in two linked PDCCH candidates for PDCCH repetition will be described in a subsequent embodiment.

Note that the same CORESET pool index being used for two linked CORESETs is simple and preferable. In contrast, for PDCCH TRP repetition, is it preferable to use different CORESET pool indices for two linked CORESETs.

According to the first embodiment described above, it is possible to appropriately judge how two linked CORESETs are associated with a CORESET pool index (indices) for PDCCH repetition.

Second Embodiment

A second embodiment relates to type-1 HARQ-ACK codebook.

FIG. 1 is a diagram to show an example of a case where two linked CORESETs are provided by using different CORESET pool indices. For the second embodiment, description will be mainly given by taking FIG. 1 as an example. However, it can be understood by those skilled in the art that application of the present embodiment is not limited to this case.

In this example, the UE is configured with two serving cells (CC0 and CC1). The UE is configured with a first CORESET and a second CORESET to operate in multi-TRP (TRP1 and TRP2) for each cell. Slots 0 to 3 are DL slots, and slot 4 is a UL slot. This similarly applies to subsequent drawings unless otherwise stated.

In FIG. 1, transmission timing for an HARQ-ACK for a PDSCH (which may be referred to as PDSCH-to-HARQ feedback timing, K1, and the like) is shown. K1 may be specified by a PDSCH-to-HARQ feedback timing indicator field included in DCI (for example, DCI format 1_0/1_1/ 1_2) for scheduling the PDSCH. Assume the last slot in which a PDSCH is received is n. Then, the UE transmits an HARQ-ACK corresponding to the PDSCH in n+K1 slot.

The UE may transmit an HARQ-ACK for DCI received in slots 0 to 3 (for a PDSCH scheduled by the DCI), in slot 4 of CC0. The UE transmits an HARQ-ACK codebook for TRP1 (CORESET pool index=0) in PUCCH #1 of CC0 and transmits an HARQ-ACK codebook for TRP2 (CORESET pool index=1) in PUCCH #2 of CC0. Broken lines shown over slots indicate the order of HARQ-ACK information bits to which the corresponding HARQ-ACK codebook corresponds (to be described in FIG. 2).

PUCCH #1 and PUCCH #2 are transmitted in resources not overlapping in terms of time in the same slot. Note that a CC in which the PUCCH is transmitted is not limited to CC0 and may be CC1 depending on a configuration or the like.

In this example, a PDSCH scheduled by each DCI is shown by a broken line. The UE receives DCI (DCI #1-1 and DCI #1-2) repeatedly transmitted by using the CORESET with the CORESET pool index=0 (first CORESET) and the CORESET with the CORESET pool index=1 (second CORESET), in slot 0 of CC0.

The DCI repeatedly transmitted schedules the same PDSCH (PDSCH #1). Note that, in the present disclosure, the "same PDSCH" may mean PDSCHs having same contents and may be transmitted from different TRPs (by using different beams).

Figure 2:
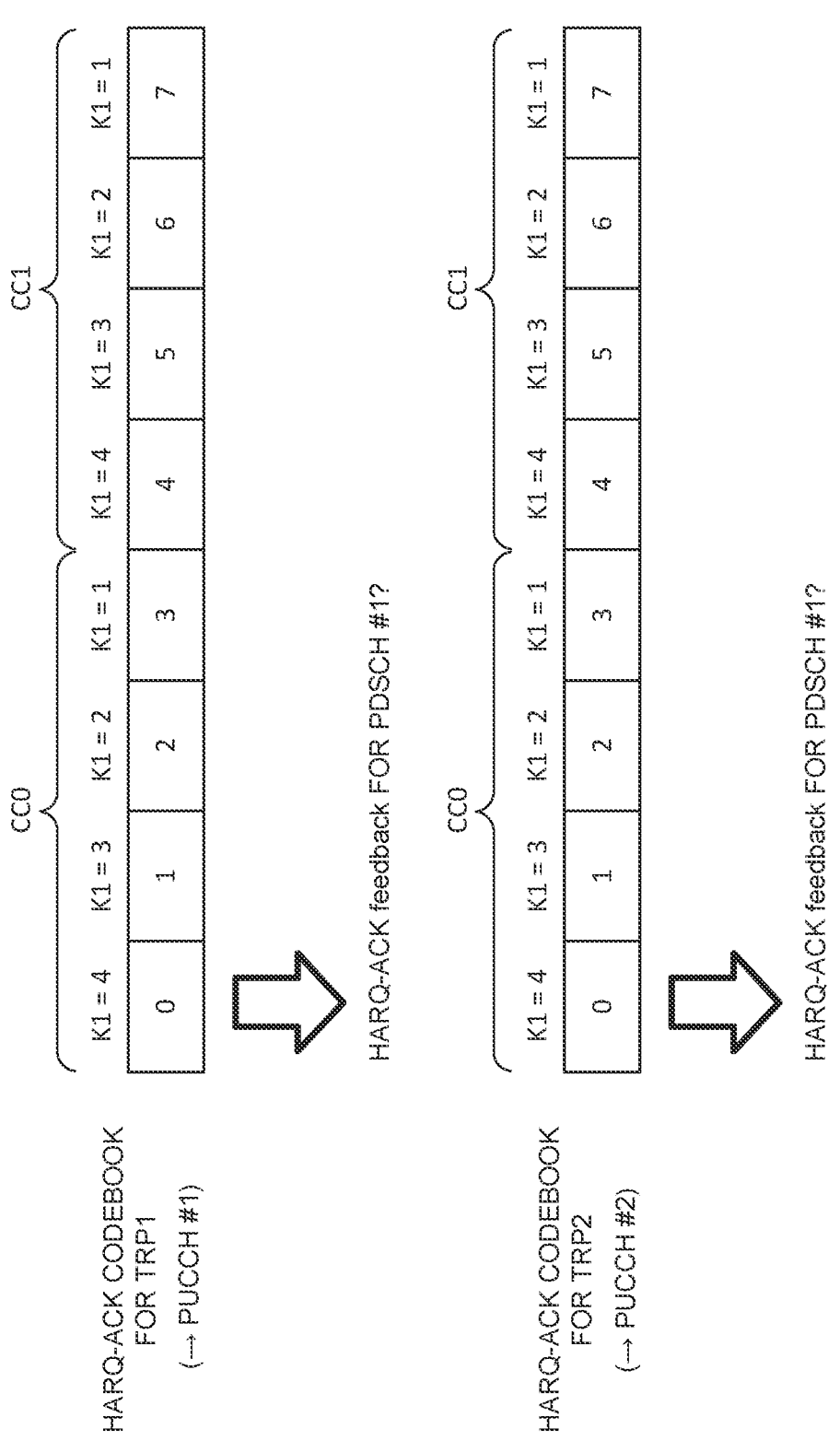
FIG. 2 is a diagram to show examples of a configuration of an HARQ-ACK codebook transmitted in a PUCCH in FIG. 1.

FIG. 2 is a diagram to show examples of a configuration of an HARQ-ACK codebook transmitted in a PUCCH in FIG. 1. For the HARQ-ACK codebook for TRP1 transmitted in PUCCH #1 and the HARQ-ACK codebook for TRP2 transmitted in PUCCH #2, PDCCH monitoring occasions included in a corresponding period (slots 0 to 3 in this example) are indexed first in ascending order of CC indices and then in descending order of K1, and HARQ-ACK bits corresponding to the PDCCH monitoring occasions are assigned in this order.

FIG. 2 shows that zeroth to third bits included in the HARQ-ACK codebook correspond to K1=4 to K1=1 of CC0 and the fourth to seventh bits correspond to K1=4 to K1=1 of CC1.

However, in the present standards, it is not clear about whether a bit (the 0-th bit in this example) corresponding to the DCI (CC0 and K1=4) received in each of the two linked CORESETs in both of the HARQ-ACK codebooks in FIG. 2 indicates HARQ-ACK feedback (HARQ-ACK bit) for PDSCH #1. Thus, the inventors of the present invention reached the second embodiment.

In the second embodiment, for PDSCHs scheduled by DCIs transmitted in two linked PDCCH candidates in two linked CORESETs having different CORESET pool indices for PDCCH repetition, only HARQ-ACK information corresponding to a PDCCH candidate (which may be referred to as a referred PDCCH candidate, a reference PDCCH candidate, a PDCCH candidate taken as reference, and the like) corresponding to any of or a combination of the following among the PDCCH candidate of the first CORESET and the PDCCH candidate of the second CORESET may be fed back:

(2-0) both a PDCCH candidate of the first CORESET and a PDCCH candidate of the second CORESET,
(2-1) a PDCCH candidate of the first CORESET,
(2-2) a PDCCH candidate of the second CORESET,
(2-3) a PDCCH candidate with an earlier or later PDCCH monitoring occasion,
(2-4) a PDCCH candidate of a CORESET with a lower or higher CORESET ID,
(2-5) a PDCCH candidate of a CORESET with a lower or higher SS set ID,
(2-6) a PDCCH candidate of a CORESET included in the same CORESET pool index as the CORESET pool index related to a PUCCH resource indicated by the DCI (when association between a PUCCH resource and a CORESET pool index is configured/defined).

When a plurality of (2-0) to (2-6) above are supported, which one of the conditions is applied may be configured/activated/indicated for the UE by using one of or a combination of higher layer signaling (for example, RRC signaling or a MAC CE) and physical layer signaling (for example, DCI). The number of PDCCH candidates of each of (2-0) to (2-6) above may be one or more.

Note that an HARQ-ACK corresponding to the CORESET pool index of the referred PDCCH candidate among DCIs transmitted in the two linked PDCCH candidates may be expressed as being valid HARQ-ACK information, and an HARQ-ACK corresponding to any other CORESET pool index may be expressed as not being valid (or being invalid) HARQ-ACK information.

The HARQ-ACK information of the PDSCH may be reported only in the HARQ-ACK codebook for the same CORESET pool index as the CORESET pool index of the referred PDCCH candidate. The HARQ-ACK information of the PDSCH (valid HARQ-ACK information) may be an ACK (for example, 1) when decoding of the PDSCH has been successful and may be a NACK (for example, 0) otherwise.

In an HARQ-ACK codebook for a CORESET pool index different from the CORESET pool index of the referred PDCCH candidate, HARQ-ACK information corresponding to the DCI (invalid HARQ-ACK information) may be NACK-fixed or ACK-fixed, or may depend on UE implementation.

Figure 3:
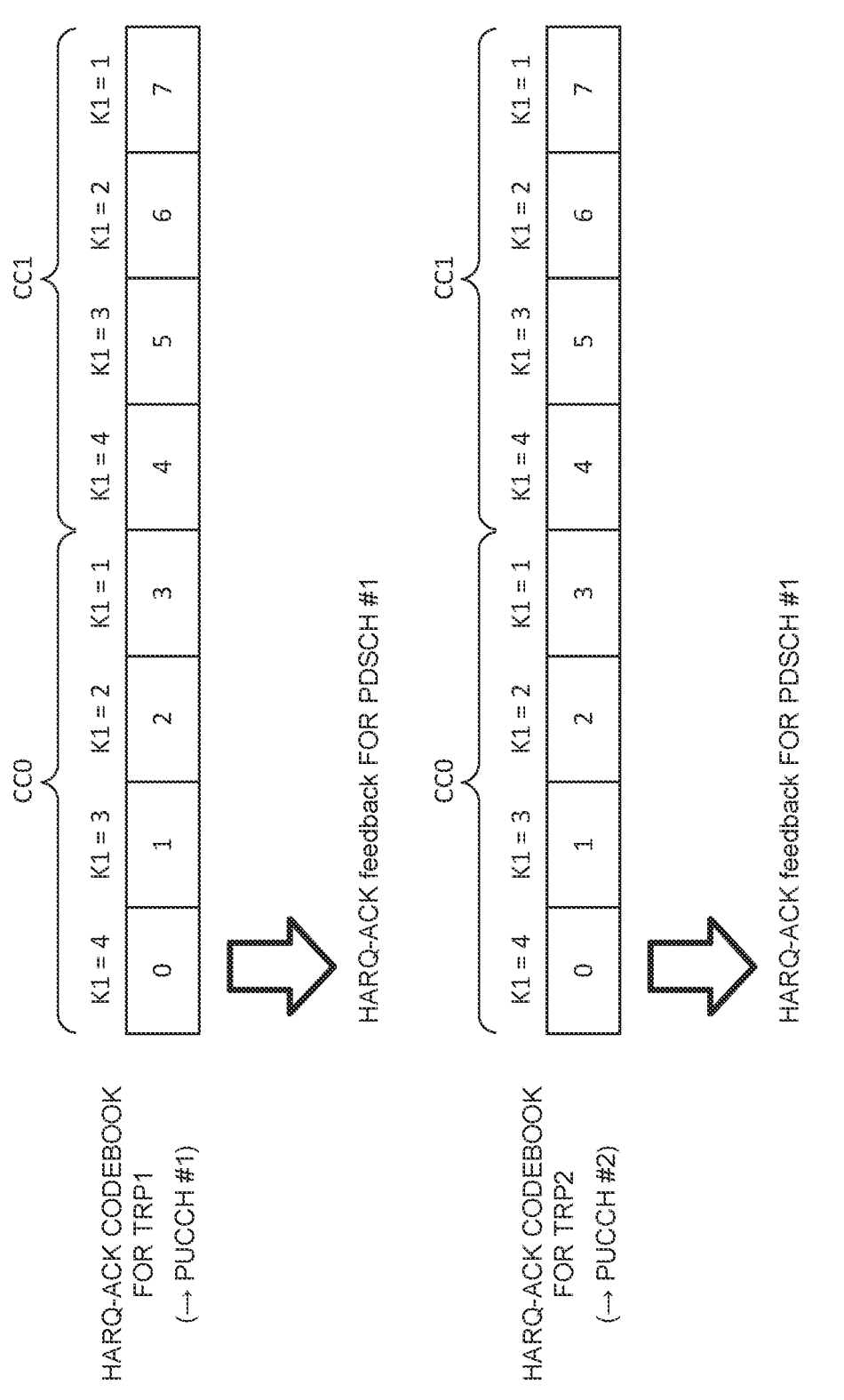
FIG. 3 is a diagram to show an example of contents of HARQ-ACK codebooks in a second embodiment.
Figure 4:
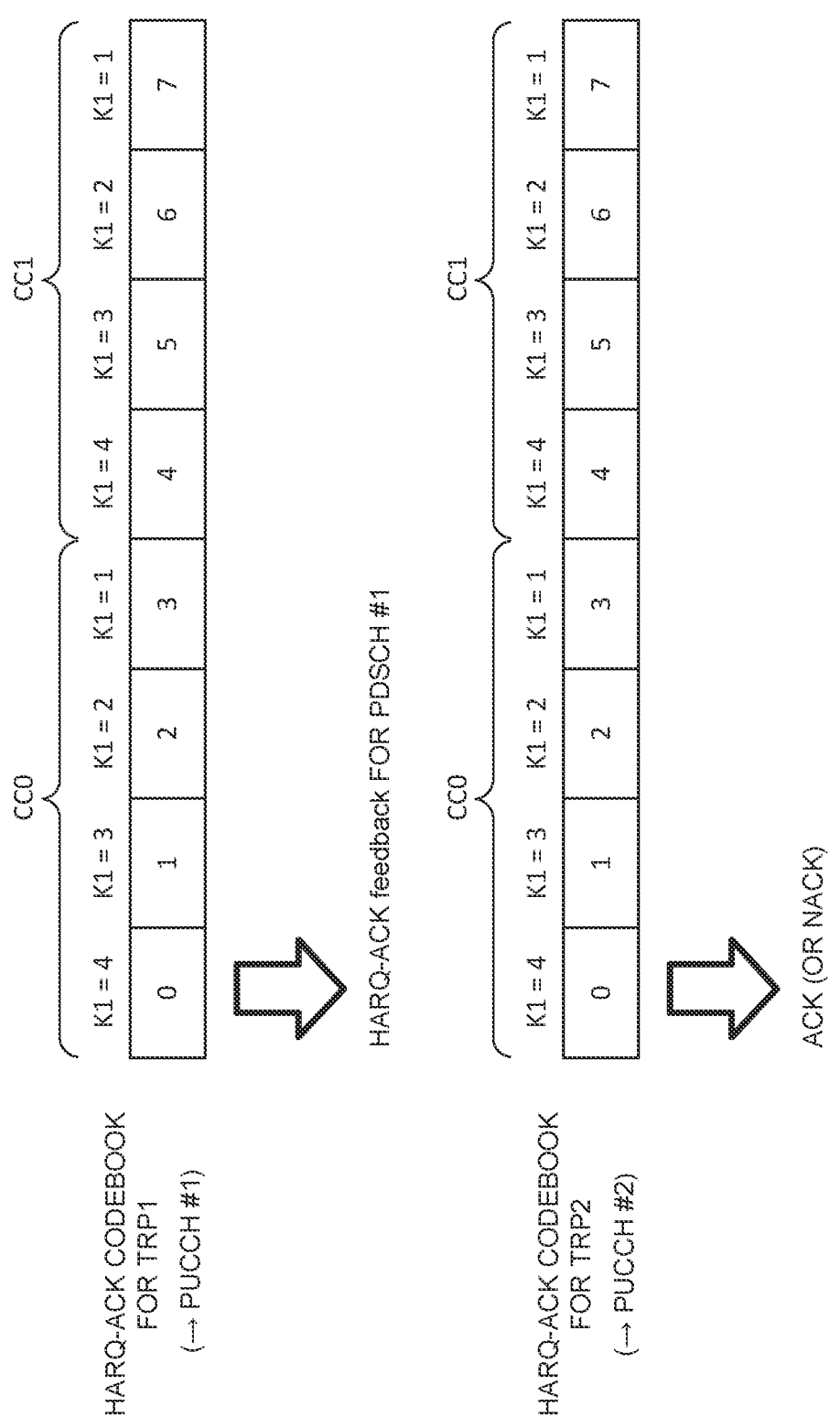
FIG. 4 is a diagram to show an example of the contents of the HARQ-ACK codebooks in the second embodiment.
Figure 5:
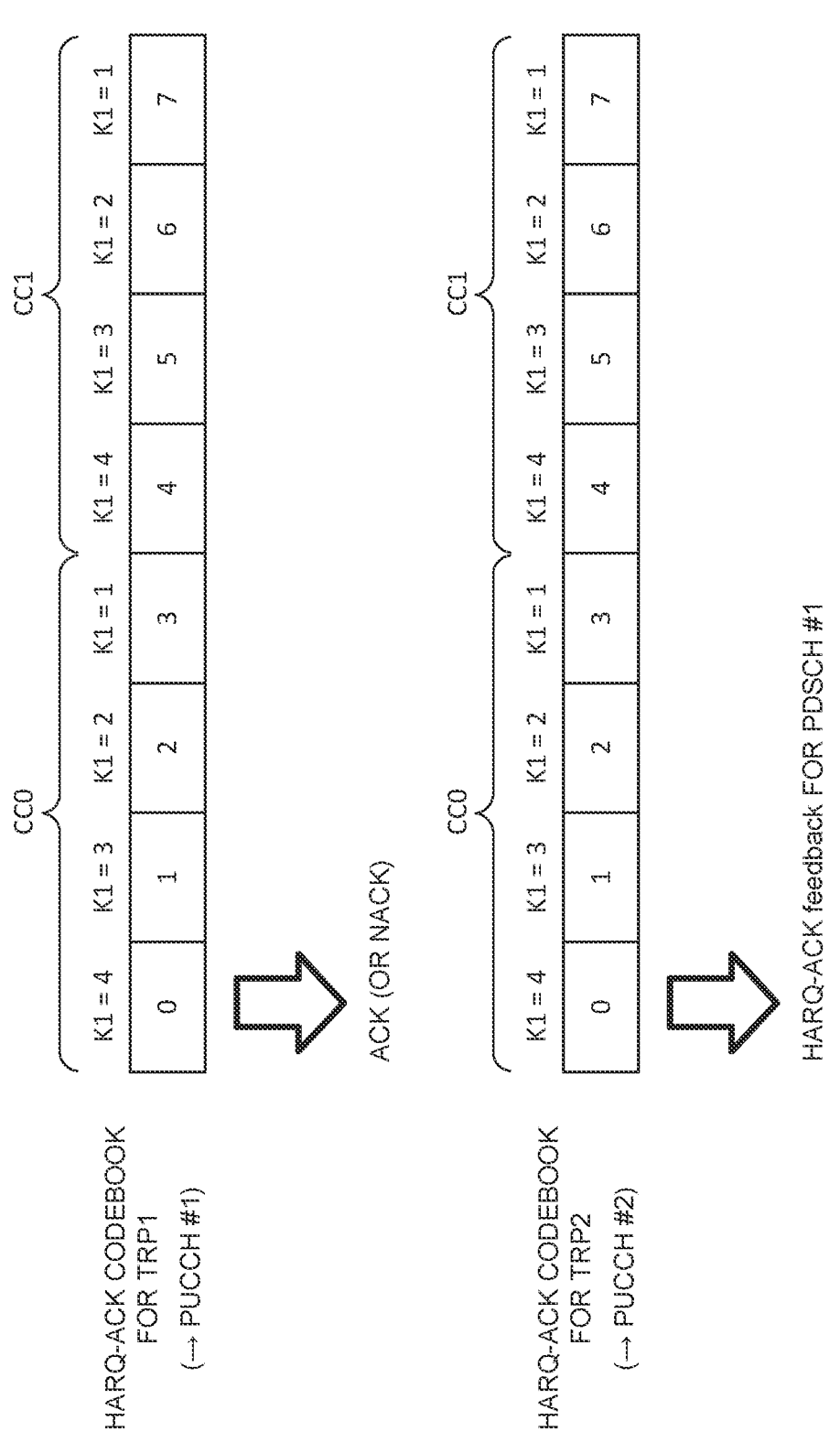
FIG. 5 is a diagram to show an example of the contents of the HARQ-ACK codebooks in the second embodiment.

FIGS. 3 to 5 are diagrams to show examples of contents of the HARQ-ACK codebooks in the second embodiment. Since description of each of the HARQ-ACK codebooks has been given in FIG. 2 except for contents of the 0-th bit, the description is not repeated.

FIG. 3 corresponds to a case following (2-0) above. The UE includes actual HARQ-ACK information for PDSCH #1 for each of the 0-th bit of the HARQ-ACK codebook for TRP1 and the 0-th bit of the HARQ-ACK codebook for TRP2.

FIG. 4 corresponds to a case following (2-1) above. The UE includes actual HARQ-ACK information for PDSCH #1 for the 0-th bit of the HARQ-ACK codebook for TRP1 and includes ACK-fixed (or NACK-fixed or UE-implementation dependent information) for the 0-th bit of the HARQ-ACK codebook for TRP2.

FIG. 5 corresponds to a case following (2-2) above. The UE includes actual HARQ-ACK information for PDSCH #1 for the 0-th bit of the HARQ-ACK codebook for TRP2 and includes ACK-fixed (or NACK-fixed or UE-implementation dependent information) for the 0-th bit of the HARQ-ACK codebook for TRP1.

{Variation of (2-0) Above}

For HARQ-ACK feedback in a given slot, a case where HARQ-ACK feedback is not indicated by another DCI in the same slot except for DCIs (repetition DCI) in two linked PDCCH candidates (in other words, only repetition DCI are received in PDCCH monitoring occasions regarding this HARQ-ACK timing), the case following (2-0) above, is considered.

In this case, since the repetition DCI indicate the same PUCCH resource, the UE cannot transmit HARQ-ACK feedback to a plurality of TRPs if another DCI, which may indicate another PUCCH resource, is not detected.

To address this problem, the UE need not expect that this case occurs (may treat this case as an error case). The UE may generate only one HARQ-ACK codebook without following (by ignoring) (2-0) above in this case to transmit HARQ-ACK information of the HARQ-ACK codebook by using one PUCCH for one TRP.

Figures 6A, 6B:
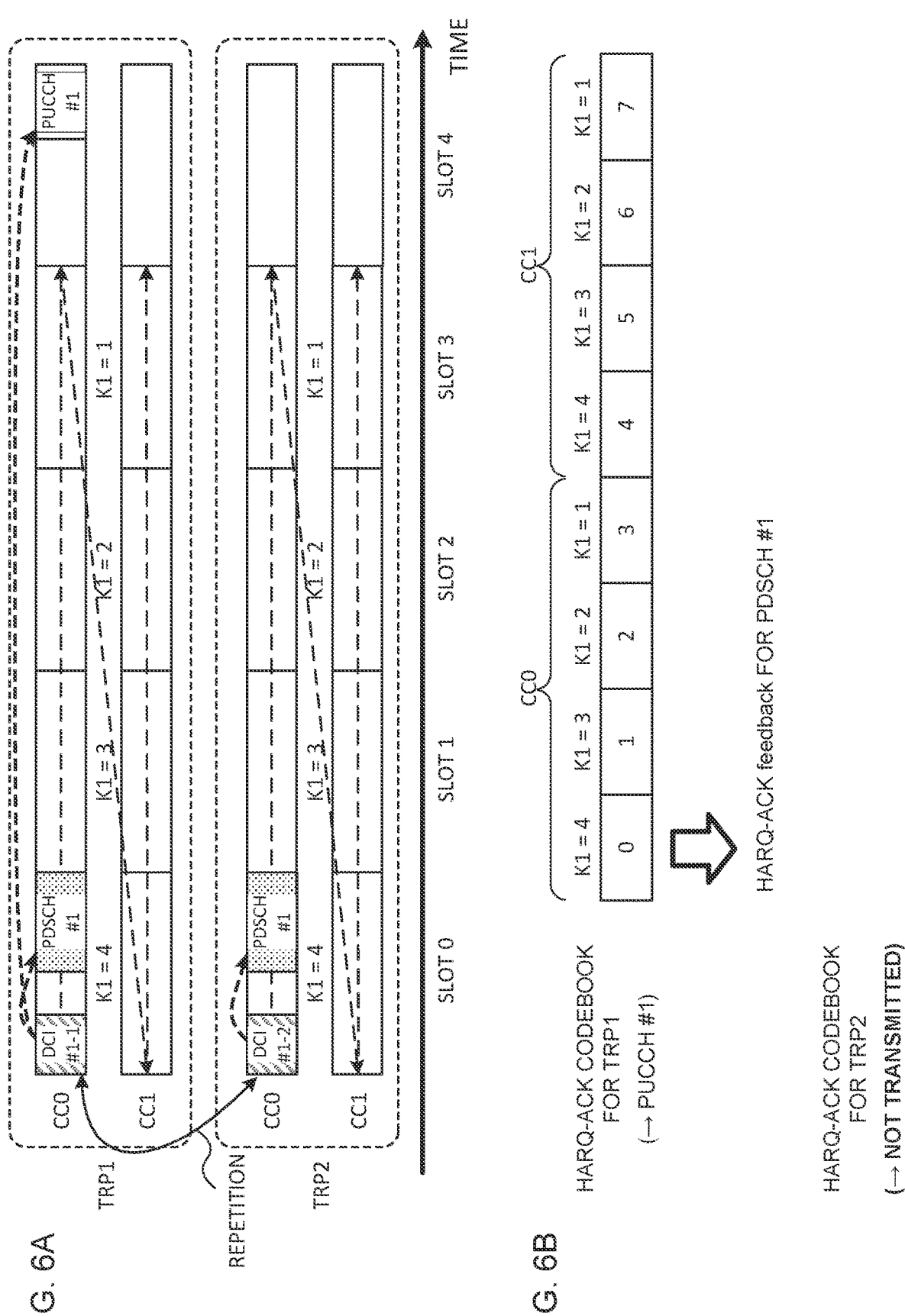
FIGS. 6A and 6B are diagrams to show a variation of (2-0) above.

FIGS. 6A and 6B are diagrams to show a variation of (2-0) above. FIG. 6A corresponds to the above case, and the UE assumes that it is determined to transmit the HARQ-ACK codebook only in PUCCH #1 indicated by DCI #1-1. Note that determination of a PUCCH resource will be described later in a fourth embodiment.

FIG. 6B shows an example of the HARQ-ACK information transmitted in the example in FIG. 6A. FIG. 6B is similar to FIG. 3 but is different from FIG. 3 in that no HARQ-ACK codebook for TRP2 is transmitted (or generated).

{Another Variation of (2-0) Above}

For HARQ-ACK feedback in a given slot, a case where a PUCCH resource corresponding to a first CORESET is indicated by DCIs (repetition DCI) in two linked PDCCH candidates and where HARQ-ACK feedback in the same slot is not indicated by another DCI of a second CORESET except for the repetition DCI (in other words, only the repetition DCI and the DCI in the first CORESET are received in PDCCH monitoring occasions regarding this HARQ-ACK timing), the case following (2-0) above, is considered.

In this case, since the repetition DCI indicate the same PUCCH resource, the UE cannot transmit HARQ-ACK feedback to TRP2 if another DCI, which may indicate another PUCCH resource, is not detected.

To address this problem, the UE need not expect that this case occurs (may treat this case as an error case). The UE may generate only an HARQ-ACK codebook for TRP1 without following (by ignoring) (2-0) above in this case to transmit HARQ-ACK information of the HARQ-ACK codebook by using one PUCCH corresponding to the first CORESET.

FIGS. 7A and 7B are diagrams to show another variation of (2-0) above. FIG. 7A corresponds to the above case, and the UE assumes that it is determined to transmit the HARQ-ACK codebook only in PUCCH #1 indicated by DCI #2 in the first CORESET, which is different from DCI #1-1. Note that determination of a PUCCH resource will be described later in the fourth embodiment. PUCCH #1 may be indicated by DCI #1-1.

FIG. 7B shows an example of the HARQ-ACK information transmitted in the example in FIG. 7A. FIG. 7B is similar to FIG. 3 but is different from FIG. 3 in that no HARQ-ACK codebook for TRP2 is transmitted (or generated).

Note that this another variation may be similar also when the first CORESET and the second CORESET are interpreted interchangeably, TRP1 and TRP2 are interpreted interchangeably, PUCCH #1 and PUCCH #2 are interpreted interchangeably, and DCI #1-1 and DCI #1-2 are interpreted interchangeably.

{Still Another Variation of (2-0) Above}

For HARQ-ACK feedback in a given slot, a case where a PUCCH resource corresponding to a first CORESET is indicated by DCIs (repetition DCI) in two linked PDCCH candidates and where HARQ-ACK feedback is not indicated by another DCI of the first CORESET in the same slot except for the repetition DCI and another DCI of a second CORESET is present (in other words, only the repetition DCI and the DCI in the second CORESET are received in PDCCH monitoring occasions regarding this HARQ-ACK timing), the case following (2-0) above, is considered.

The UE may generate only an HARQ-ACK codebook for TRP2 without following (by ignoring) (2-0) above in this case to transmit HARQ-ACK information of the HARQ-ACK codebook by using one PUCCH corresponding to the second CORESET.

Figures 8A, 8B:
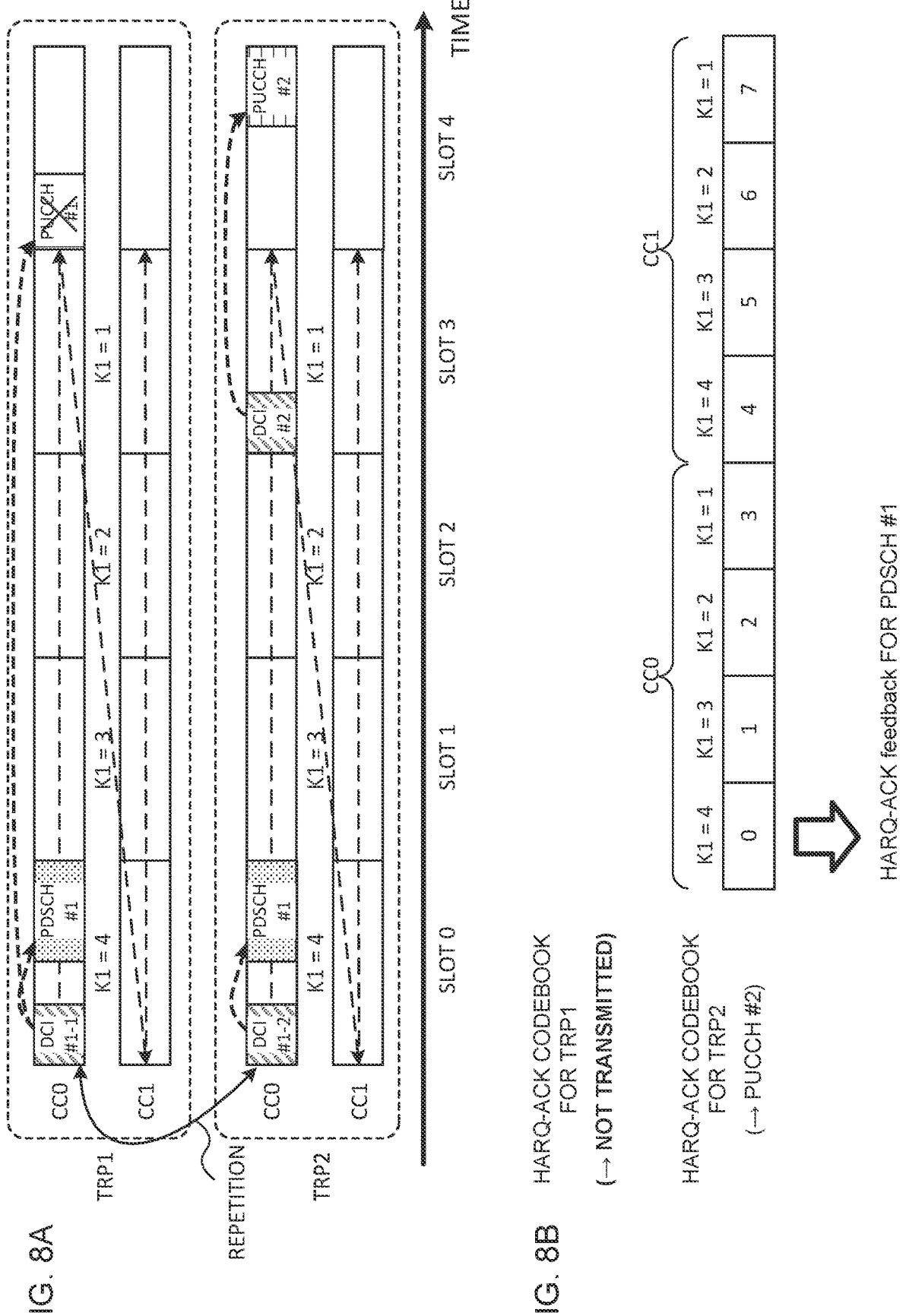
FIGS. 8A and 8B are diagrams to show still another variation of (2-0) above.

FIGS. 8A and 8B are diagrams to show still another variation of (2-0) above. FIG. 8A corresponds to the above case, and the UE assumes that it is determined to transmit the HARQ-ACK codebook only in PUCCH #2 indicated by DCI #2 in the second CORESET, which is different from DCI #1-2. PUCCH #1 indicated by DCI #1-1 is not transmitted. Note that determination of a PUCCH resource will be described later in the fourth embodiment.

In original (2-0), the HARQ-ACK codebooks for TRP1 and TRP2 are transmitted in PUCCHs #1 and #2, respectively. However, according to the still another variation of (2-0), the PUCCH resource of PUCCH #1 can be saved (for example, can be used for transmission of another signal/ channel).

FIG. 8B shows an example of the HARQ-ACK information transmitted in the example in FIG. 8A. FIG. 8B is similar to FIG. 3 but is different from FIG. 3 in that no HARQ-ACK codebook for TRP1 is transmitted (or generated).

Note that this still another variation may be similar also when the first CORESET and the second CORESET are interpreted interchangeably, TRP1 and TRP2 are interpreted interchangeably, PUCCH #1 and PUCCH #2 are interpreted interchangeably, and DCI #1-1 and DCI #1-2 are interpreted interchangeably.

{Variation of (2-1) to (2-6) Above}

For HARQ-ACK feedback in a given slot, a case where a PUCCH resource corresponding to a first CORESET is indicated by DCIs (repetition DCI) in two linked PDCCH candidates and where HARQ-ACK feedback in the same slot is not indicated by another DCI of the first CORESET except for the repetition DCI and another DCI of a second CORESET is present (in other words, only the repetition DCI and the DCI in the second CORESET are received in PDCCH monitoring occasions regarding this HARQ-ACK timing), the case being such that transmission of an HARQ-ACK codebook for TRP1 is determined according to at least one of (2-1) to (2-6) above, is considered.

The UE may generate only an HARQ-ACK codebook for TRP2 without following (by ignoring) (2-1) to (2-6) above in this case to transmit HARQ-ACK information of the HARQ-ACK codebook by using one PUCCH corresponding to the second CORESET.

The variation of (2-1) to (2-6) above may be described by using FIGS. 8A and 8B above, for example. For example, for the case following (2-1) above, the UE assumes that it is determined to transmit the HARQ-ACK codebook only in PUCCH #2 indicated by DCI #2 in the second CORESET, which is different from DCI #1-2. PUCCH #1 indicated by DCI #1-1 is not transmitted. Note that determination of a PUCCH resource will be described later in the fourth embodiment.

In original (2-1), the HARQ-ACK codebook for TRP1 is transmitted in PUCCH #1. However, according to the variation of (2-1), the HARQ-ACK codebook for TRP2 is transmitted in PUCCH #2, and hence the PUCCH resource of PUCCH #1 can be saved (for example, can be used for transmission of another signal/channel).

Note that this variation of (2-1) to (2-6) may be similar also when the first CORESET and the second CORESET are interpreted interchangeably, TRP1 and TRP2 are interpreted interchangeably, PUCCH #1 and PUCCH #2 are interpreted interchangeably, and DCI #1-1 and DCI #1-2 are interpreted interchangeably.

According to the second embodiment described above, when two linked CORESETs are used for PDCCH repetition, the UE can generate appropriate type-1 HARQ-ACK codebook.

Third Embodiment

A third embodiment relates to type-2 HARQ-ACK codebook.

Figure 9:
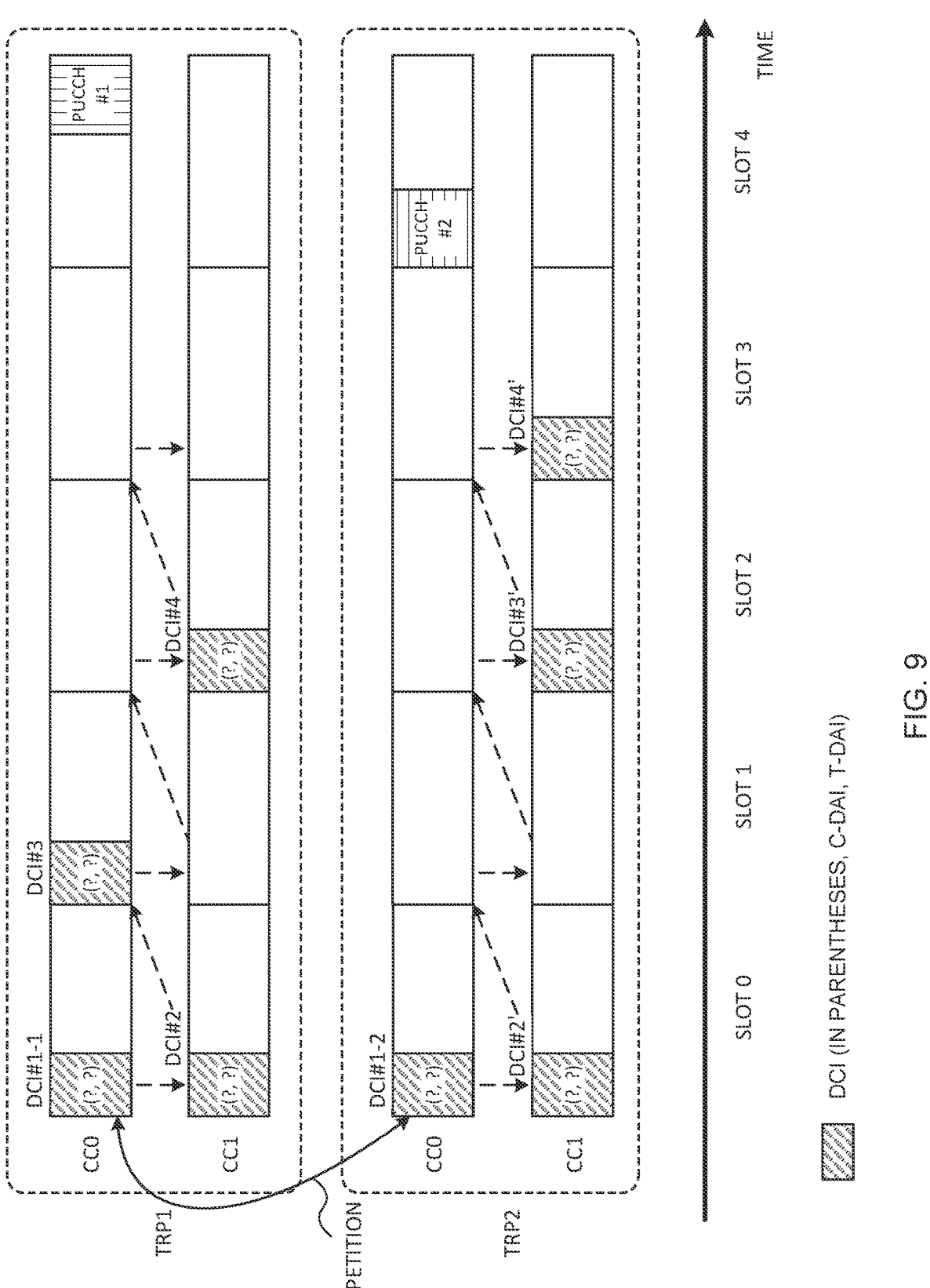
FIG. 9 is a diagram to show a problem of DAIs in a case where two linked CORESETs are provided by using different CORESET pool indices.

FIG. 9 is a diagram to show a problem of DAIs in a case where two linked CORESETs are provided by using different CORESET pool indices. Respects for which description is omitted may be similar to those in FIG. 1.

In this example, the UE detects DCI (DCI #1-1 and DCI #1-2) repeatedly transmitted by using the CORESET with the CORESET pool index=0 (first CORESET) and the CORESET with the CORESET pool index=1 (second CORESET), in slot 0 of CC0.

The UE detects normal DCI #2, DCI #3, and DCI #4 (not transmitted in repetition transmission) in slot 0 of CC1, slot 1 of CC0, and slot 2 of CC1 of the first CORESET, respectively.

The UE also detects normal DCI #2', DCI #3', and DCI #4' (not transmitted in repetition transmission) in slots 0, 2, and 3 of CC1 of the second CORESET, respectively.

In the present standards of Rel-16 NR, it is not clear what values are taken by DAIs (C-DAI, T-DAI) for repetition DCI transmitted in two linked CORESETs corresponding to different CORESET pool indices. In other words, it is not clear, while the contents (payloads) of the repetition DCI transmitted in the two linked CORESETs (also referred to as two repetition DCI) are the same (DAIs are also the same value), whether the DAI of each of the repetition DCI is a value for TRP1 or a value for TRP2.

As shown by broken lines, the DAIs correspond to values obtained by counting DCIs in ascending order of serving cell indices and then ascending order of PDCCH monitoring occasions. However, how to treat the repetition DCI is not clear either. Hence, the C-DAI and the T-DAI for each DCI shown in FIG. 9 cannot be specified (shown by "?"). Thus, the inventors of the present invention reached the third embodiment.

In the third embodiment, for DCIs transmitted in two linked PDCCH candidates in two linked CORESETs having different CORESET pool indices for PDCCH repetition, it may be configured so as to indicate DAIs (C-DAI, T-DAI) corresponding to a PDCCH candidate (which may be referred to as a referred PDCCH candidate, a reference PDCCH candidate, a PDCCH candidate taken as reference, and the like) corresponding to any of or a combination of the following among the PDCCH candidate of the first CORESET and the PDCCH candidate of the second CORESET (the UE may assume that such DAIs are indicated):

(3-1) a PDCCH candidate of the first CORESET, (3-2) a PDCCH candidate of the second CORESET, (3-3) a PDCCH candidate with an earlier or later PDCCH monitoring occasion, (3-4) a PDCCH candidate of a CORESET with a lower or higher CORESET ID, (3-5) a PDCCH candidate of a CORESET with a lower or higher SS set ID, (3-6) a PDCCH candidate of a CORESET included in the same CORESET pool index as the CORESET pool index related to a PUCCH resource indicated by the DCI (when association between a PUCCH resource and a CORESET pool index is configured/defined).

When a plurality of (3-1) to (3-6) above are supported, which one of the conditions is applied may be configured/activated/indicated for the UE by using one of or a combination of higher layer signaling (for example, RRC signaling or a MAC CE) and physical layer signaling (for example, DCI). The number of PDCCH candidates of each of (3-1) to (3-6) above may be one or more.

Note that, although the value of each DAI is counted up independently for each TRP (CORESET pool index), it may be assumed that, for a given CORESET pool index, only when a referred PDCCH candidate corresponds to the same CORESET pool index, the DAI of a repetition DCI is counted in association with (subsequently to) the DAI of another DCI. Specifically, the DAIs included in the two repetition DCI (with the same contents) are determined to indicate values of the DAI derived by assuming a CORESET pool index (first/second CORESET) to which the reference PDCCH candidate belongs. In other words, for the C-DAI and the T-DAI of DCI with the same CORESET pool index as that of the reference PDCCH candidate, the repetition DCI may be taken into account (may be counted). For the C-DAI and the T-DAI of DCI with a different CORESET pool index from that of the reference PDCCH candidate, the repetition DCI may be ignored (need not be counted). For example, in a case of (3-1) above, the DAIs of the DCIs indicate the value of the DAI obtained by assuming the first CORESET. Hence, the UE may assume that the DAI of DCI #1-1 in FIG. 9 received in the PDCCH corresponding to the first CORESET is a correct (or valid) value to use the DAI for determination of the number of HARQ-ACK bits while the UE may assume that the DAI of DCI #1-2 received in the PDCCH corresponding to the second CORESET is an incorrect (or invalid) value not to use the DAI for determination of the number of HARQ-ACK bits.

Note that the count of a DAI based on at least one of (3-1) to (3-6) above may be applied to a case where the two linked PDCCH candidates belong to the same PDCCH monitoring occasion or may be applied to a case where the two linked PDCCH candidates belong to different PDCCH monitoring occasions. How to count a DAI based on at least one of (3-1) to (3-6) above may be different between a case where the two linked PDCCH candidates belong to the same PDCCH monitoring occasion and a case where the two linked PDCCH candidates belong to different PDCCH monitoring occasions.

Figure 10:
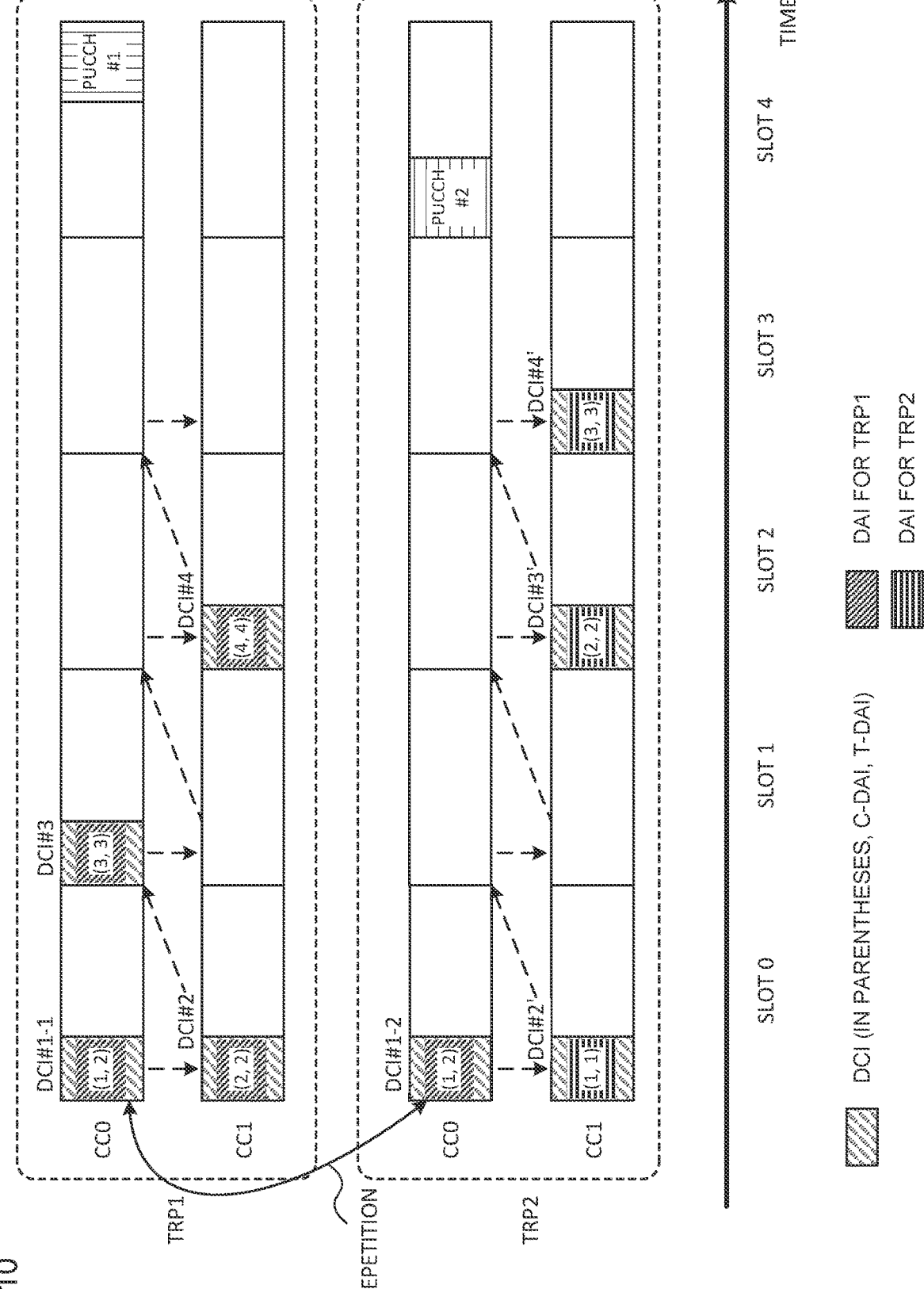
FIG. 10 is a diagram to show an example of numbering of DAIs in a third embodiment.
Figure 11:
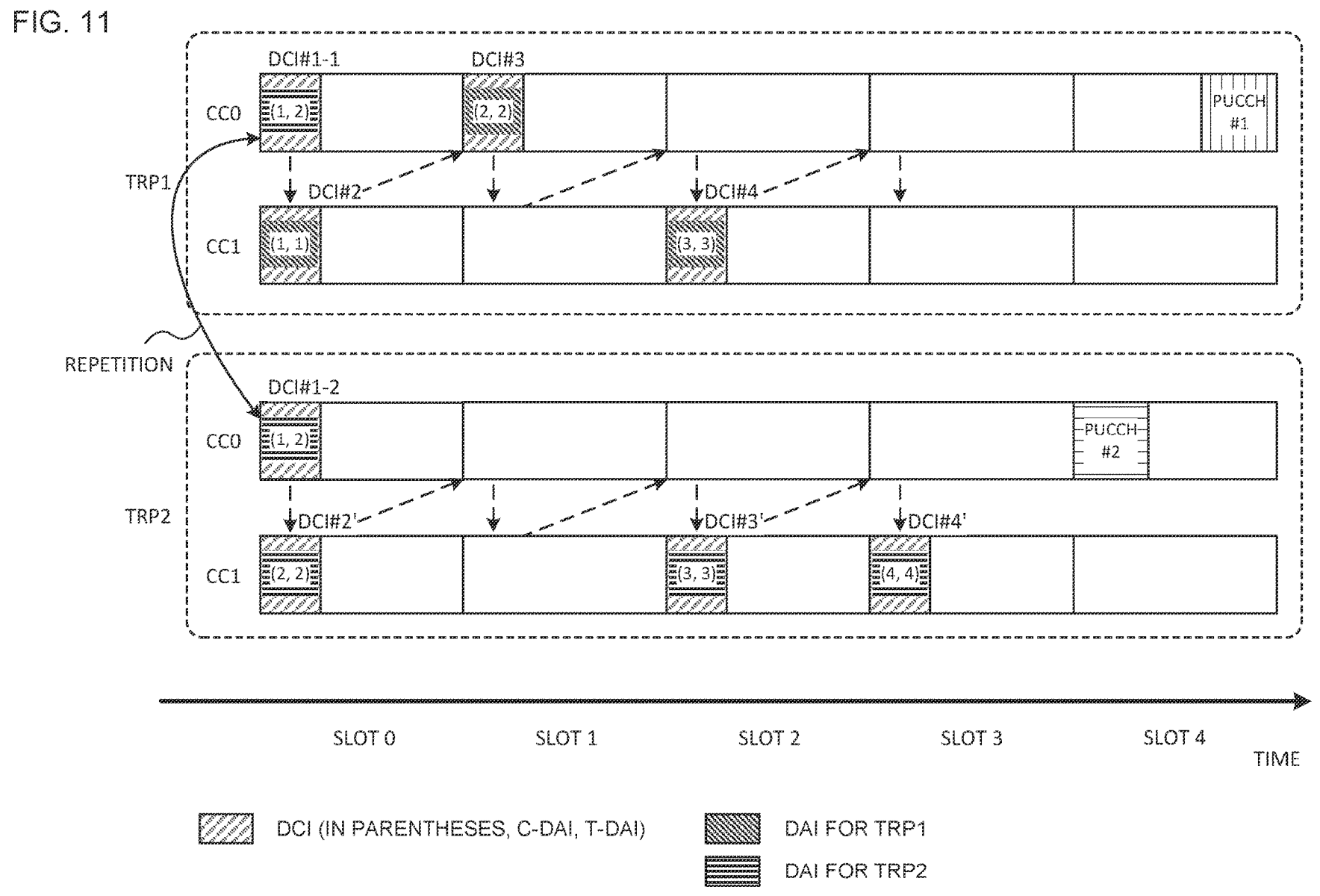

FIGS. 10 and 11 are diagrams to show examples of the numbering of DAIs in the third embodiment. Respects for which description is omitted may be similar to those in FIG. 9.

Note that the value of a DAI is normally expressed by applying modulo arithmetic (expressed by the remainder of a division of an original value by a given number (for example, 4) (in other words, the original value mod given number)). However, in the example of the present disclosure, the value is expressed without applying modulo arithmetic to facilitate understanding.

FIG. 10 corresponds to a case following (3-1) above. In slot 0, there are two DCIs in TRP1, and DCI #1-1 includes (C-DAI, T-DAI)=(1, 2) while DCI #2 includes (C-DAI, T-DAI)=(2, 2). DCI #3 and DCI #4 are counted subsequently to DCI #2 and includes (C-DAI, T-DAI)=(3, 3), (4, 4), respectively.

Meanwhile, in slot 0, there are two DCIs in TRP2, but DCI #1-2 includes (C-DAI, T-DAI)=(1, 2), which is the same as those of DCI #1-1. DCI #2' is counted by ignoring DCI #1-2 and includes (C-DAI, T-DAI)=(1, 1). DCI #3' and DCI #4' are counted subsequently to DCI #2' and includes (C-DAI, T-DAI)=(2, 2), (3, 3), respectively.

FIG. 11 corresponds to a case following (3-2) above. In slot 0, there are two DCIs in TRP2, and DCI #1-2 includes (C-DAI, T-DAI)=(1, 2) while DCI #2' includes (C-DAI, T-DAI)=(2, 2). DCI #3' and DCI #4' are counted subsequently to DCI #2' and includes (C-DAI, T-DAI)=(3, 3), (4, 4), respectively.

Meanwhile, in slot 0, there are two DCIs in TRP1, but DCI #1-1 includes (C-DAI, T-DAI)=(1, 2), which is the same as those of DCI #1-2. DCI #2 is counted by ignoring DCI #1-1 and includes (C-DAI, T-DAI)=(1, 1). DCI #3 and DCI #4 are counted subsequently to DCI #2 and includes (C-DAI, T-DAI)=(2, 2), (3, 3), respectively.

Note that, although a case of including only DCIs each indicating both a C-DAI and a T-DAI (for example, DCI format 1_1/1_2) has been given in the description of the third embodiment, this is not restrictive. The third embodiment is applicable to a case of using at least one of DCI indicating both a C-DAI and a T-DAI and DCI indicating only a C-DAI (for example, DCI format 1_0).

According to the third embodiment described above, when two linked CORESETs are used for PDCCH repetition, the UE can generate appropriate type-2 HARQ-ACK codebook.

Fourth Embodiment

The fourth embodiment relates to determination of a PUCCH resource for transmitting separate HARQ-ACK feedback.

In the present standards of Rel-15/16 NR, it is defined that a PUCCH resource for transmitting an HARQ-ACK in a given slot is determined based on a PRI included in the last DCI format (also referred to as the last DCI below) among the DCI formats (for example, DCI format 1_0/1_1/1_2) having a value of a PDSCH-to-HARQ feedback timing indicator field indicating PUCCH transmission in the slot.

More specifically, in the present standards of Rel-15/16 NR, determination of a PUCCH resource is based on one PUCCH resource indicator field (if present). Here, this one PUCCH resource indicator field is included in the last DCI format among DCI formats having a value indicating the same slot for PUCCH transmission, detected by the UE, and used by the UE to transmit corresponding HARQ-ACK information in a PUCCH.

The value indicating the same slot may be a value of a PDSCH-to-HARQ feedback timing indicator field (PDSCH-to-HARQ feedback timing indicator field) (if present), a value of a higher layer parameter indicating a period from DL data to UL-ACK (dl-DataToUL-ACK), or a value of a higher layer parameter indicating a period from DL data to UL-ACK for DCI format 1_2 (dl-DataToUL-ACKForDCI-Format1_2).

In the present standards of Rel-15/16 NR, for determination of a PUCCH resource, detected DCI formats are first indexed in ascending order across a plurality of serving cell indices for the same PDCCH monitoring occasion and are then indexed in ascending order across PDCCH monitoring occasion indices ("For PUCCH resource determination, detected DCI formats are first indexed in an ascending order across serving cells indexes for a same PDCCH monitoring occasion and are then indexed in an ascending order across PDCCH monitoring occasion indexes"). The "last DCI format" above means the last DCI format (corresponding to the highest index) indexed according to this rule among the detected DCI formats corresponding to PUCCH transmissions in the same slot.

In the present standard of Rel. 16, a different PUCCH resource is determined for each TRP for separate HARQ-ACK feedback.

Figure 12:
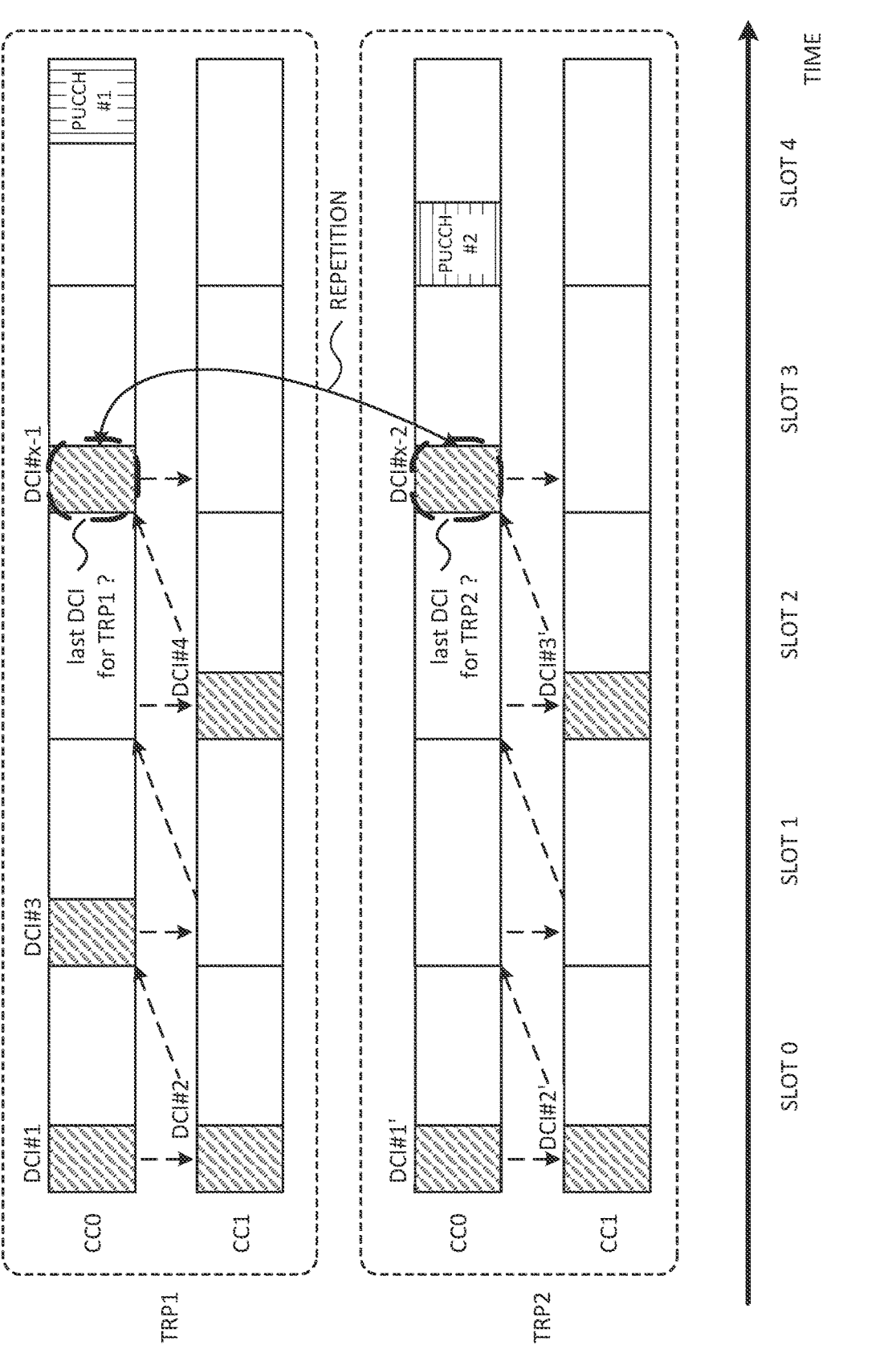
FIG. 12 is a diagram to show a problem of determination of the last DCI in a case where two linked CORESETs are provided by using different CORESET pool indices.

FIG. 12 is a diagram to show a problem of determination of the last DCI in a case where two linked CORESETs are provided by using different CORESET pool indices. Respects for which description is omitted may be similar to those in FIG. 9.

In this example, the UE detects normal DCI #1, DCI #2, DCI #3, and DCI #4 (not transmitted in repetition transmission) in slot 0 of CC0, slot 0 of CC1, slot 1 of CC0, and slot 2 of CC1 of the first CORESET, respectively.

The UE detects normal DCI #1', DCI #2', and DCI #3' (not transmitted in repetition transmission) in slot 0 of CC0, slot 0 of CC1, and slot 3 of CC1 of the second CORESET, respectively.

The UE detects DCI (DCI #x-1 and DCI #x-2) repeatedly transmitted by using the CORESET with the CORESET pool index=0 (first CORESET) and the CORESET with the CORESET pool index=1 (second CORESET), in slot 3 of CC0.

In the present standards, it is not clear how to treat repetition DCI transmitted in two linked CORESETs corresponding to different CORESET pool indices for determination of the "last DCI format." In other words, it is not clear whether the DCIs can be the "last DCI format." Hence, it cannot be specified whether DCI #x-1 and DCI #x-2 shown in FIG. 12 correspond respectively to the "last DCI" for TRP1 and TRP2 (shown by "?"). Thus, the inventors of the present invention reached the fourth embodiment.

In the fourth embodiment, for DCIs transmitted in two linked PDCCH candidates in two linked CORESETs having different CORESET pool indices for PDCCH repetition, the DCIs may be used as the "last DCI format" for PUCCH resource determination if the DCI correspond to a PDCCH candidate (which may be referred to as a referred PDCCH candidate, a reference PDCCH candidate, a PDCCH candidate taken as reference, and the like) corresponding to any of or a combination of the following among the PDCCH candidate of the first CORESET and the PDCCH candidate of the second CORESET:

(4-0) a PDCCH candidate of the first CORESET/a PDCCH candidate of the second CORESET, (4-1) a PDCCH candidate of the first CORESET, (4-2) a PDCCH candidate of the second CORESET, (4-3) a PDCCH candidate with an earlier or later PDCCH monitoring occasion, (4-4) a PDCCH candidate of a CORESET with a lower or higher CORESET ID, (4-5) a PDCCH candidate of a CORESET with a lower or higher SS set ID, (4-6) a PDCCH candidate of a CORESET included in the same CORESET pool index as the CORESET pool index related to a PUCCH resource indicated by the DCI (when association between a PUCCH resource and a CORESET pool index is configured/defined).

When a plurality of (4-0) to (4-6) above are supported, which one of the conditions is applied may be configured/activated/indicated for the UE by using one of or a combination of higher layer signaling (for example, RRC signaling or a MAC CE) and physical layer signaling (for example, DCI). The number of PDCCH candidates of each of (4-0) to (4-6) above may be one or more.

It may be assumed that the repetition DCI can be the "last DCI format" only when the referred PDCCH candidate corresponds to the same CORESET pool index. In other words, for determination of a PUCCH resource with the same CORESET pool index as that of the reference PDCCH candidate, the repetition DCI may be taken into account (can be the "last DCI format"). For determination of a PUCCH resource with a different CORESET pool index from that of the reference PDCCH candidate, the repetition DCI may be ignored (do not serve as the "last DCI format").

Note that the determination of a PUCCH resource based on at least one of (4-0) to (4-6) above may be applied to a case where the two linked PDCCH candidates belong to the same PDCCH monitoring occasion or may be applied to a case where the two linked PDCCH candidates belong to different PDCCH monitoring occasions. How to determine a PUCCH resource based on at least one of (4-0) to (4-6) above may be different between a case where the two linked PDCCH candidates belong to the same PDCCH monitoring occasion and a case where the two linked PDCCH candidates belong to different PDCCH monitoring occasions.

Figure 13:
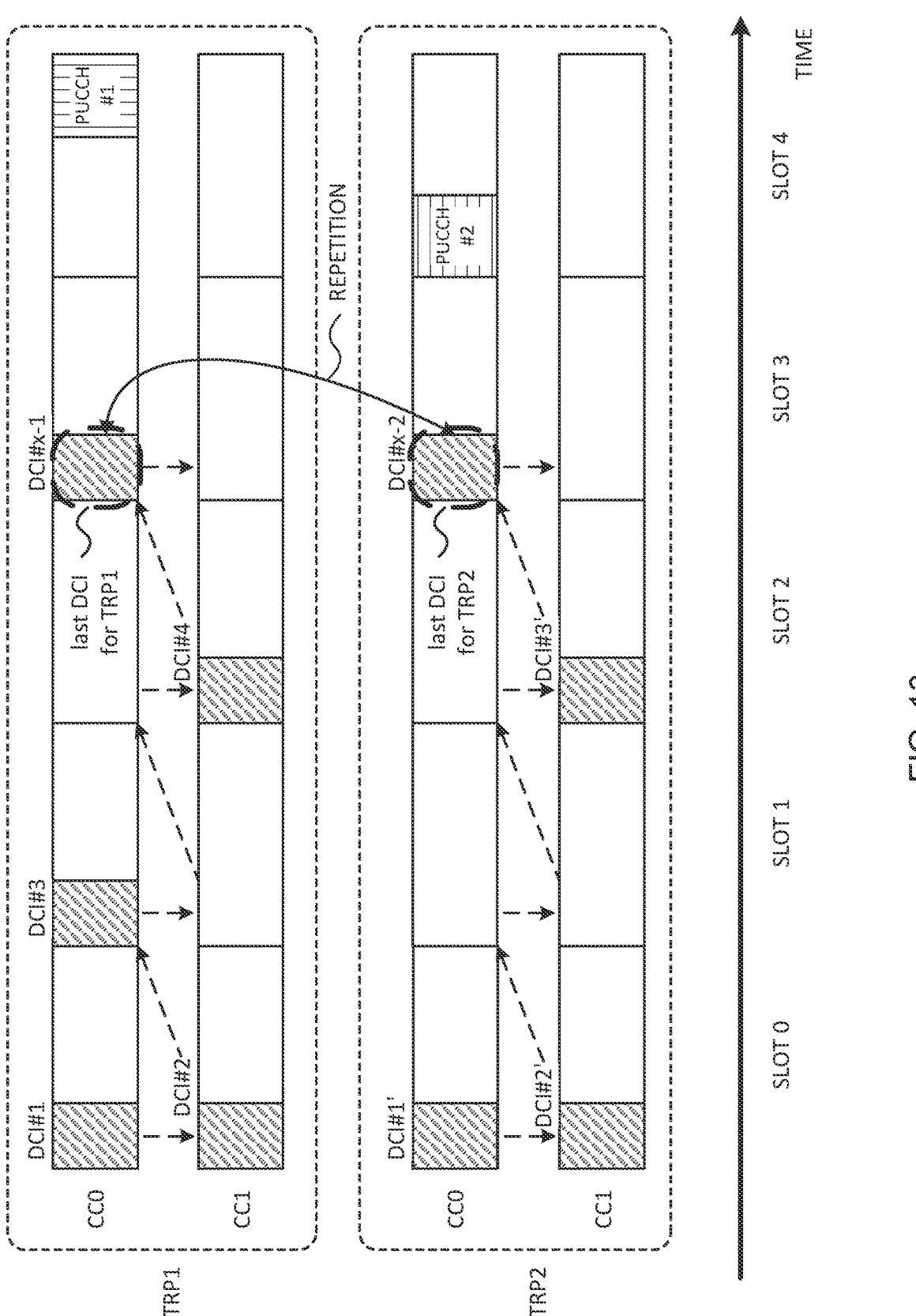
FIG. 13 is a diagram to show an example of determination of the last DCI format in a fourth embodiment.
Figure 14:
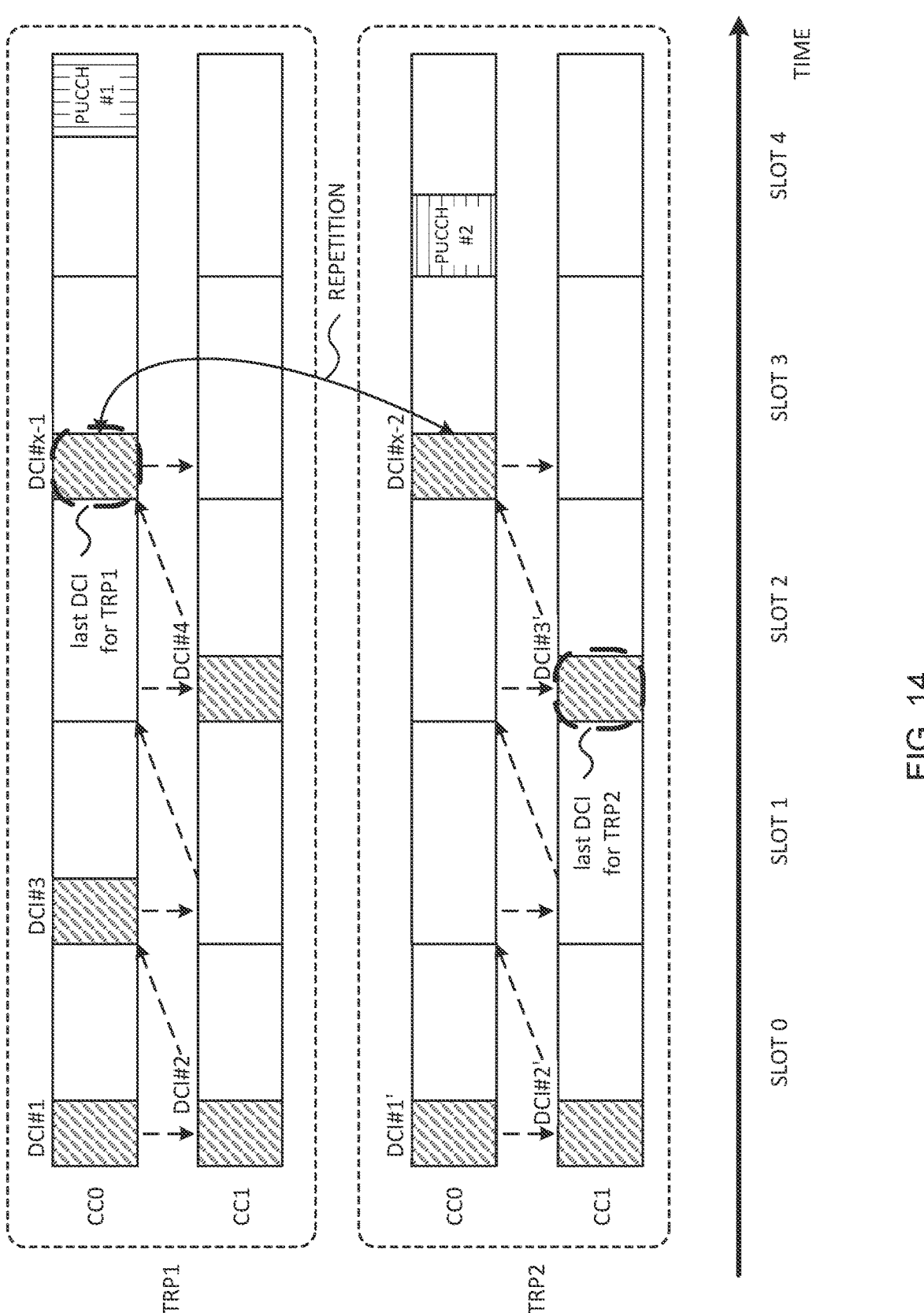
FIG. 14 is a diagram to show an example of the determination of the last DCI format in the fourth embodiment.
Figure 15:
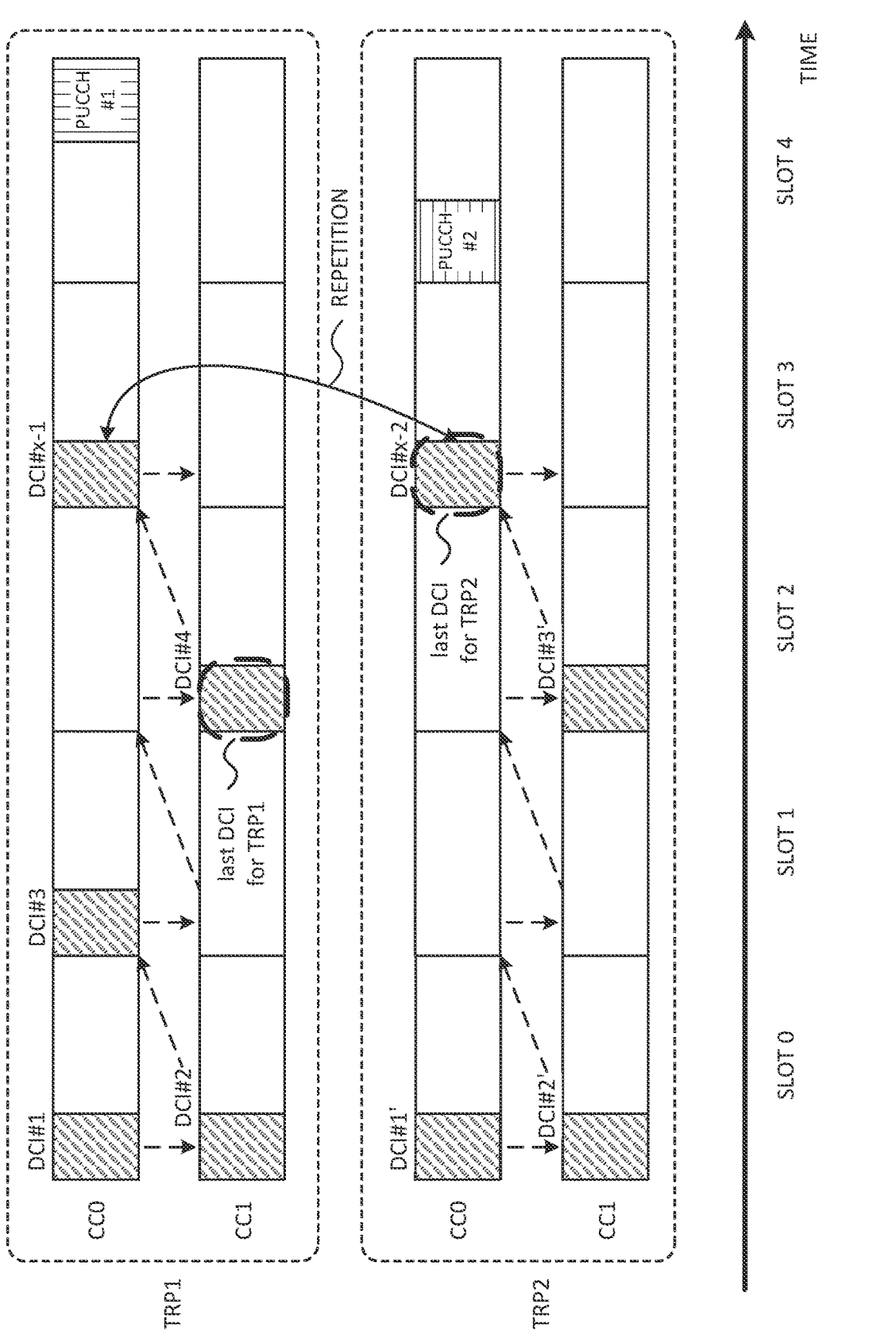
FIG. 15 is a diagram to show an example of the determination of the last DCI format in the fourth embodiment.

FIGS. 13 to 15 are diagrams to show examples of determination of the last DCI format in the fourth embodiment. Respects for which description is omitted may be similar to those in FIG. 12.

FIG. 13 corresponds to a case following (4-0) above. In this case, the repetition DCI can be the last DCI formats for the first CORESET and the second CORESET. In this example, the last DCI for TRP1 is DCI #x-1, and the last DCI for TRP2 is DCI #x-2.

Note that, since the contents of the repetition DCI are the same, the values of the PRI field indicated by DCI #x-1 and DCI #x-2 are the same. In the present disclosure, determination of a PUCCH resource may be based only on a PRI or may be determined based on a PRI and another parameter (for example, at least one of the CCE index of the CCE in which the last DCI is detected, the number of CCEs in the CORESETs used for detection of the last DCI, and the like). According to such an aspect, as shown in FIG. 13, even when the last DCIs of both TRPs correspond to repetition DCI, a PUCCH resource for TRP1 (PUCCH #1) and a PUCCH resource for TRP2 (PUCCH #2) can be made different from each other appropriately.

Note that, as mentioned in "Variation of (2-0)" above and the like, when a PUCCH resource for TRP1 and a PUCCH resource for TRP2 are the same, an HARQ-ACK may be transmitted by using only one of the PUCCH resources.

When a PUCCH resource for TRP1 determined based only on a PRI and a PUCCH for TRP2 determined based only on a PRI are the same, the UE may determine at least one of the PUCCH resources, based on any of the following, to make the PUCCH resource for TRP1 and the PUCCH resource for TRP2 different from each other:

only a PRI, only a parameter other than a PRI (for example, at least one of the CCE index of the CCE in which the last DCI is detected, the number of CCEs of CORESETs used for detection of the last DCI, and the like), a combination of a PRI and the parameter other than the PRI.

FIG. 14 corresponds to a case following (4-1) above. In this case, the repetition DCI can be the last DCI format for the first CORESET. In this example, the last DCI for TRP1 is DCI #x-1, and the last DCI for TRP2 is DCI #3'.

FIG. 15 corresponds to a case following (4-2) above. In this case, the repetition DCI can be the last DCI format for the second CORESET. In this example, the last DCI for TRP1 is DCI #4, and the last DCI for TRP2 is DCI #x-2.

Note that the determination of a type-1 HARQ-ACK codebook based on at least one of (2-0) to (2-6) above and the determination of a PUCCH resource based on at least one of (4-0) to (4-6) above may be combined optionally for use.

The determination of a type-2 HARQ-ACK codebook based on at least one of (3-1) to (3-6) above and the determination of a PUCCH resource based on at least one of (4-0) to (4-6) above may be combined optionally for use.

For example, any of the following combinations may be used for the determination of an HARQ-ACK codebook and the determination of a PUCCH resource:

(2-0) and (4-0),
(2-1)/(3-1) and (4-1),
(2-2)/(3-2) and (4-2),
(2-3)/(3-3) and (4-3),
(2-4)/(3-4) and (4-4),
(2-5)/(3-5) and (4-5),
(2-6)/(3-6) and (4-6).

These combinations correspond to cases of determining a reference PDCCH candidate for determination of an HARQ-ACK codebook and a reference PDCCH candidate for determination of a PUCCH, based on the same rule.

According to the fourth embodiment described above, when two linked CORESETs are used for PDCCH repetition, the UE can determine an appropriate PUCCH resource for HARQ-ACK transmission.

Fifth Embodiment

A fifth embodiment relates to simultaneous transmission of PUCCHs/PUSCHs corresponding to different CORESET pool indices.

In the present standards of Rel-16 NR, it is defined that the UE configured with a first CORESET and a second CORESET and configured with separate HARQ-ACK feedback does not expect that a PUCCH/PUSCH triggered by detection of a DCI format in a PDCCH received in a CORESET included in the first CORESET overlaps a PUCCH/PUSCH triggered by detection of a DCI format in a PDCCH received in a CORESET included in the second CORESET in terms of time.

Figure 16:
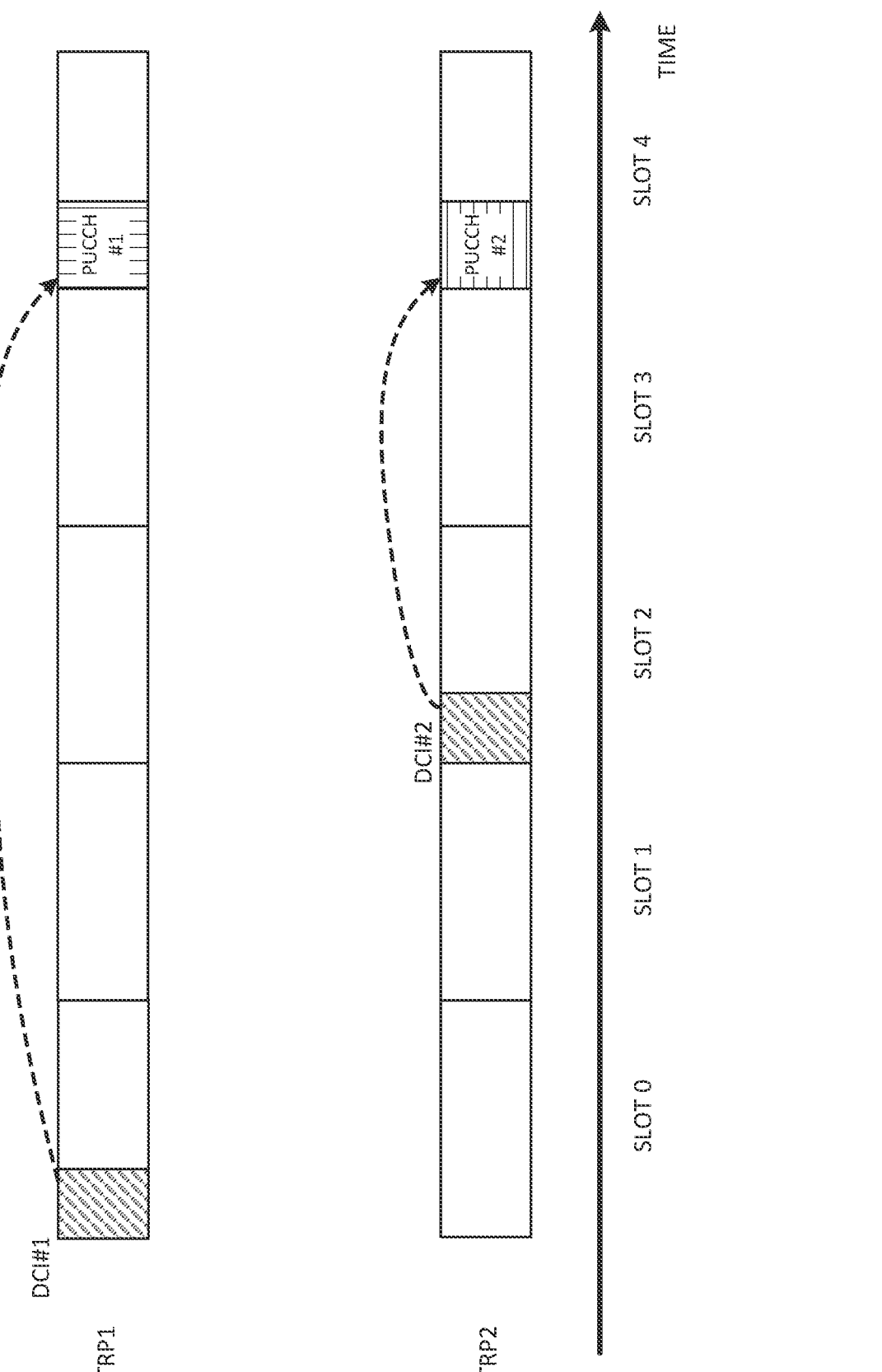
FIG. 16 is a diagram to show an example of restriction of simultaneous PUCCH/PUSCH transmission in a present standard in Rel-16 NR.

FIG. 16 is a diagram to show an example of restriction of simultaneous PUCCH/PUSCH transmission in a present standard in Rel-16 NR. Respects for which description is omitted may be similar to those in FIGS. 1 and 9 and the like. It is assumed that a CC for TRP1 and a CC for TRP2 shown in FIG. 16 are the same.

In this example, the UE detects DCI #1 that triggers PUCCH #1 in slot 4, in slot 0 of the first CORESET. The UE detects DCI #1 that triggers PUCCH #2 in slot 4, in slot 2 of the second CORESET.

In this example, PUCCHs #1 and #2 overlap in terms of time. The UE does not expect such a case as this example (does not assume that such a schedule is performed).

In the present standards, it is not clear how to treat repetition DCI transmitted in two linked CORESETs corresponding to different CORESET pool indices for the above restriction of simultaneous PUCCH/PUSCH transmission. In other words, it is not clear whether PUCCHs/PUSCHs triggered by the repetition DCI are restricted by the simultaneous PUCCH/PUSCH transmission as described above. Thus, the inventors of the present invention reached the fifth embodiment.

In the fifth embodiment, for DCIs transmitted in two linked PDCCH candidates in two linked CORESETs having different CORESET pool indices for PDCCH repetition, it may be assumed that only a PUCCH (s)/PUSCH (s) triggered by the DCI detected in a PDCCH candidate (which may be referred to as a referred PDCCH candidate, a reference PDCCH candidate, a PDCCH candidate taken as reference, and the like) corresponding to any of or a combination of the following among the PDCCH candidate of the first CORESET and the PDCCH candidate of the second CORESET is restricted by simultaneous PUCCH/PUSCH transmission similar to that of Rel-16 NR described above:

(5-1) a PDCCH candidate of the first CORESET, (5-2) a PDCCH candidate of the second CORESET, (5-3) a PDCCH candidate with an earlier or later PDCCH monitoring occasion, (5-4) a PDCCH candidate of a CORESET with a lower or higher CORESET ID, (5-5) a PDCCH candidate of a CORESET with a lower or higher SS set ID, (5-6) a PDCCH candidate of a CORESET included in the same CORESET pool index as the CORESET pool index related to a PUCCH resource indicated by the DCI (when association between a PUCCH resource and a CORESET pool index is configured/defined).

When a plurality of (5-1) to (5-6) above are supported, which one of the conditions is applied may be configured/activated/indicated for the UE by using one of or a combination of higher layer signaling (for example, RRC signaling or a MAC CE) and physical layer signaling (for example, DCI). The number of PDCCH candidates of each of (5-1) to (5-6) above may be one or more.

It may be assumed that the repetition DCI are restricted by the simultaneous PUCCH/PUSCH transmission as described above only when referred PDCCH candidate correspond to the same CORESET pool index. In other words, for determination of restriction of simultaneous PUCCH/PUSCH transmission with the same CORESET pool index as that of the reference PDCCH candidate, the repetition DCI may be taken into account (are restricted by the simultaneous PUCCH/PUSCH transmission). For determination of a PUCCH resource with a different CORESET pool index from that of the reference PDCCH candidate, the repetition DCI may be ignored (are not restricted by the simultaneous PUCCH/PUSCH transmission).

Note that the restriction of simultaneous PUCCH/PUSCH transmission based on at least one of (5-1) to (5-6) above may be applied to a case where the two linked PDCCH candidates belong to the same PDCCH monitoring occasion or may be applied to a case where the two linked PDCCH candidates belong to different PDCCH monitoring occasions. How to restrict simultaneous PUCCH/PUSCH transmission based on at least one of (5-0) to (5-6) above may be different between a case where the two linked PDCCH candidates belong to the same PDCCH monitoring occasion and a case where the two linked PDCCH candidates belong to different PDCCH monitoring occasions.

Figure 17:
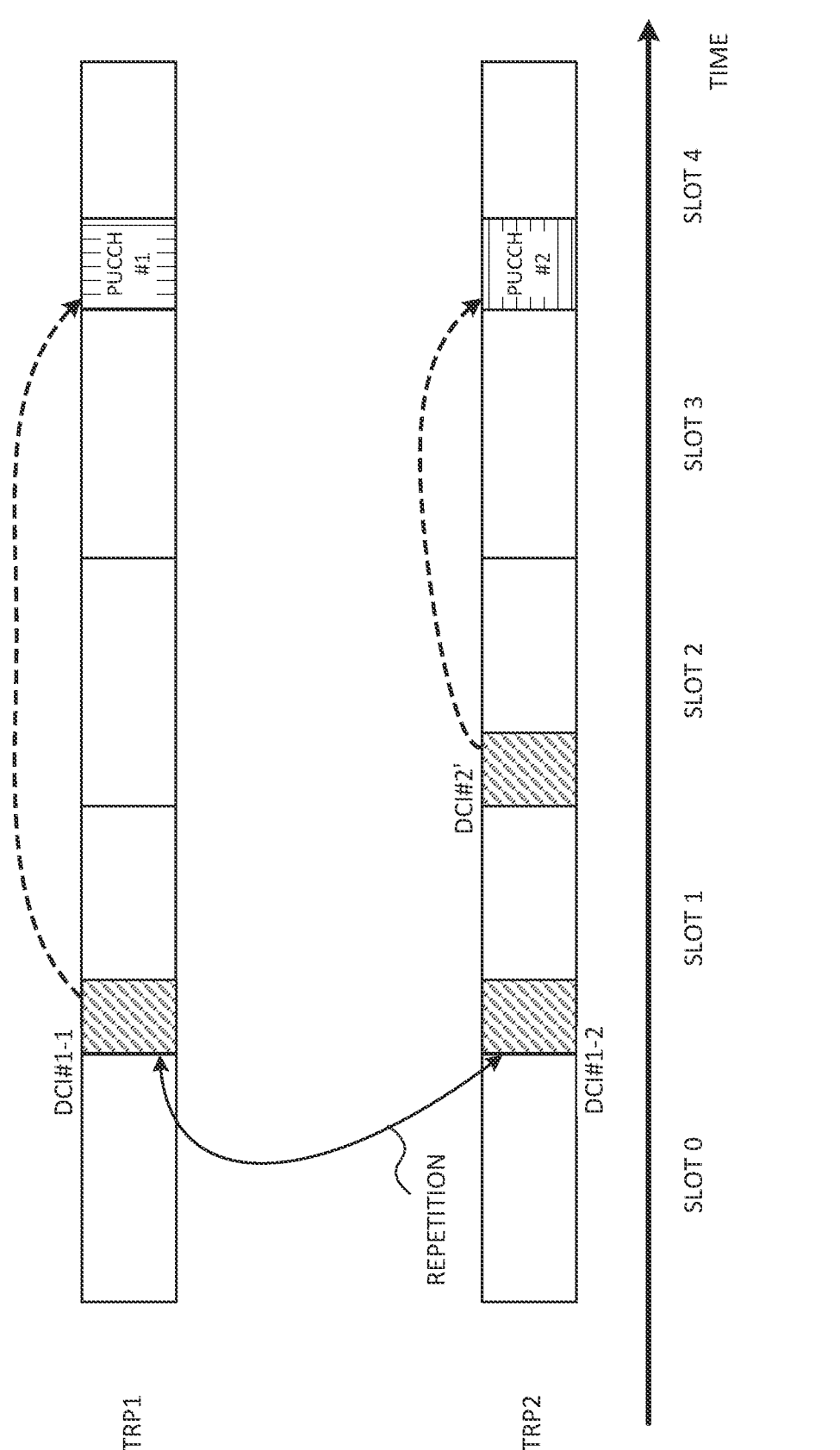
FIG. 17 is a diagram to show an example of restriction of simultaneous PUCCH/PUSCH transmission in a fifth embodiment.

FIG. 17 is a diagram to show an example of restriction of simultaneous PUCCH/PUSCH transmission in the fifth embodiment. Respects for which description is omitted may be similar to those in FIG. 16. In this example, the UE detects DCI (DCI #1-1 and DCI #1-2) repeatedly transmitted by using the CORESET with the CORESET pool index=0 (first CORESET) and the CORESET with the CORESET pool index=1 (second CORESET), in slot 1. The repetition DCI triggers PUCCH #1 for TRP1.

The UE detects DCI #2' that triggers PUCCH #2 in slot #4, in slot 2 of the second CORESET. In this example, PUCCHs #1 and #2 overlap in terms of time.

FIG. 17 corresponds to a case following (5-1) above. In this case, PUCCHs/PUSCHs triggered by repetition DCI are restricted by the simultaneous transmission for the first CORESET (when being transmitted for TRP1). Hence, the UE does not expect such a case as this example (does not assume that such a schedule is performed).

Figure 18:
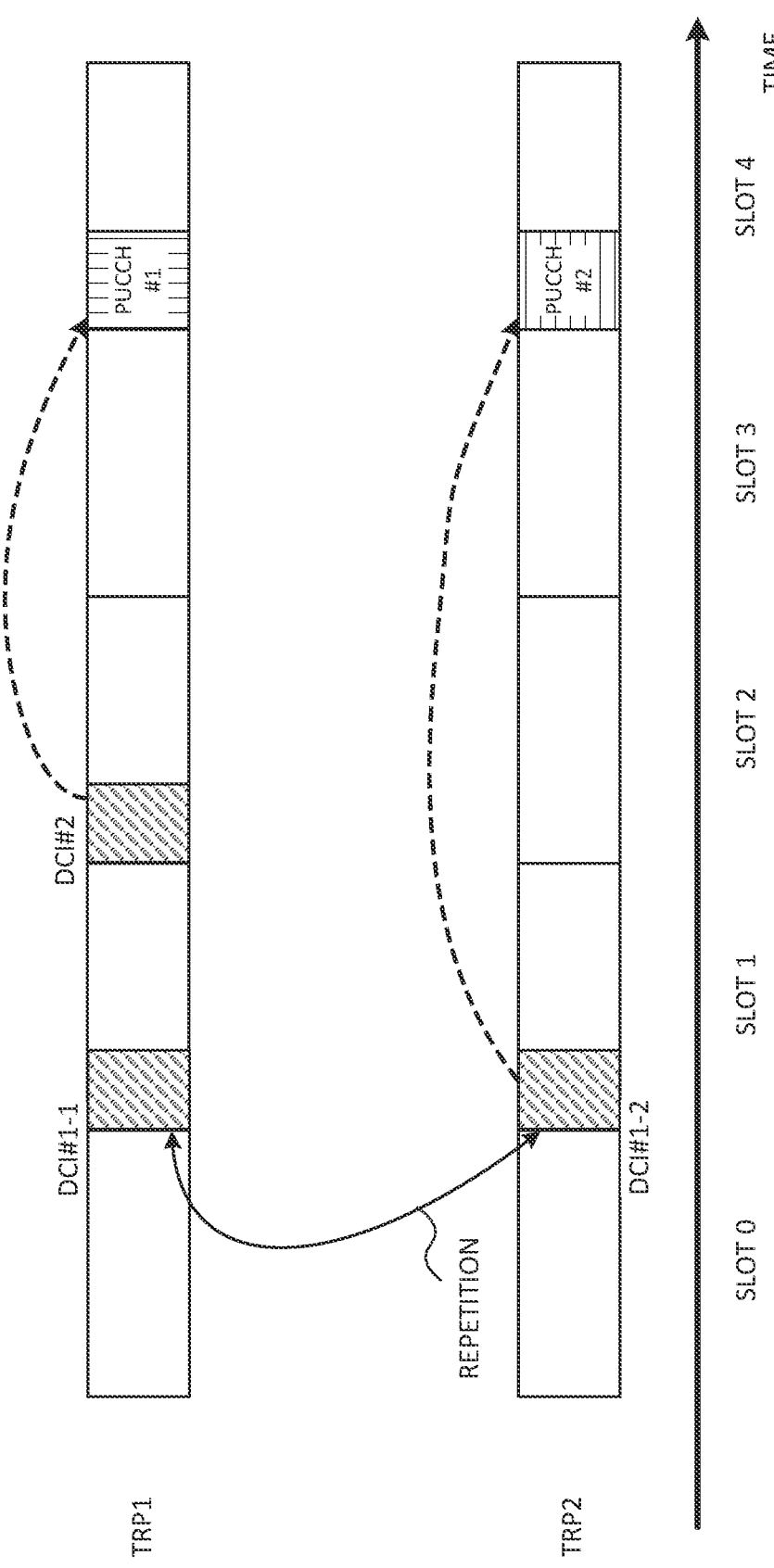
FIG. 18 is a diagram to show another example of the restriction of simultaneous PUCCH/PUSCH transmission in the fifth embodiment.

FIG. 18 is a diagram to show another example of the restriction of simultaneous PUCCH/PUSCH transmission in the fifth embodiment. Respects for which description is omitted may be similar to those in FIG. 16. In this example, the UE detects DCI (DCI #1-1 and DCI #1-2) repeatedly transmitted by using the CORESET with the CORESET pool index=0 (first CORESET) and the CORESET with the CORESET pool index=1 (second CORESET), in slot 1. The repetition DCI triggers PUCCH #2 for TRP2.

The UE detects DCI #2 that triggers PUCCH #1 in slot #4, in slot 2 of the first CORESET. In this example, PUCCHs #1 and #2 overlap in terms of time.

FIG. 18 corresponds to a case following (5-2) above. In this case, PUCCHs/PUSCHs triggered by repetition DCI are restricted by the simultaneous transmission for the second CORESET (when being transmitted for TRP2). Hence, the UE does not expect such a case as this example (does not assume that such a schedule is performed).

Note that the determination of a PUCCH resource based on at least one of (4-0) to (4-6) above and the restriction of simultaneous PUCCH/PUSCH transmission based on at least one of (5-1) to (5-6) above may be combined optionally for use.

For example, any of the following combinations may be used for determination of a PUCCH resource and restriction of simultaneous PUCCH/PUSCH transmission:

(4-1) and (5-1), (4-2) and (5-2), (4-3) and (5-3), (4-4) and (5-4), (4-5) and (5-5), (4-6) and (5-6).

These combinations correspond to cases of determining a reference PDCCH candidate for determination of a PUCCH and a reference PDCCH candidate for restriction of simultaneous PUCCH/PUSCH transmission, based on the same rule.

According to the fifth embodiment described above, when two linked CORESETs are used for PDCCH repetition, the UE can judge restriction of simultaneous PUCCH/PUSCH transmission appropriately.

Others

Note that at least one of the above-described embodiments may be applied only to a UE that has reported a specific UE capability or that supports the specific UE capability.

The specific UE capability may indicate at least one of the following:

whether to support a multi-TRP PDCCH repetition scheme, whether to support two (or two or more) PDCCH repetitions in two (or two or more) CORESETs with different CORESET pool indices, whether to support two (or two or more) PDCCH repetitions in two (or two or more) CORESETs with different CORESET pool indices in a case of separate HARQ-ACK feedback, whether to support two (or two or more) PDCCH repetitions in two (or two or more) CORESETs with different CORESET pool indices in a case of separate HARQ-ACK feedback for type-1 (or type-2) HARQ-ACK codebook.

At least one of the above-described embodiments may be applied to a case where specific information related to the above-described embodiment is configured for the UE by higher layer signaling (in a case where the specific information is not configured, Rel-15/16 operation is applied, for example). For example, the specific information may be information indicating activation of a PDCCH repetition scheme for different CORESET pool indices, information indicating configuration of two CORESETs related to two linked SS sets, any RRC parameter for a specific release (for example, Rel. 17), or the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 19:
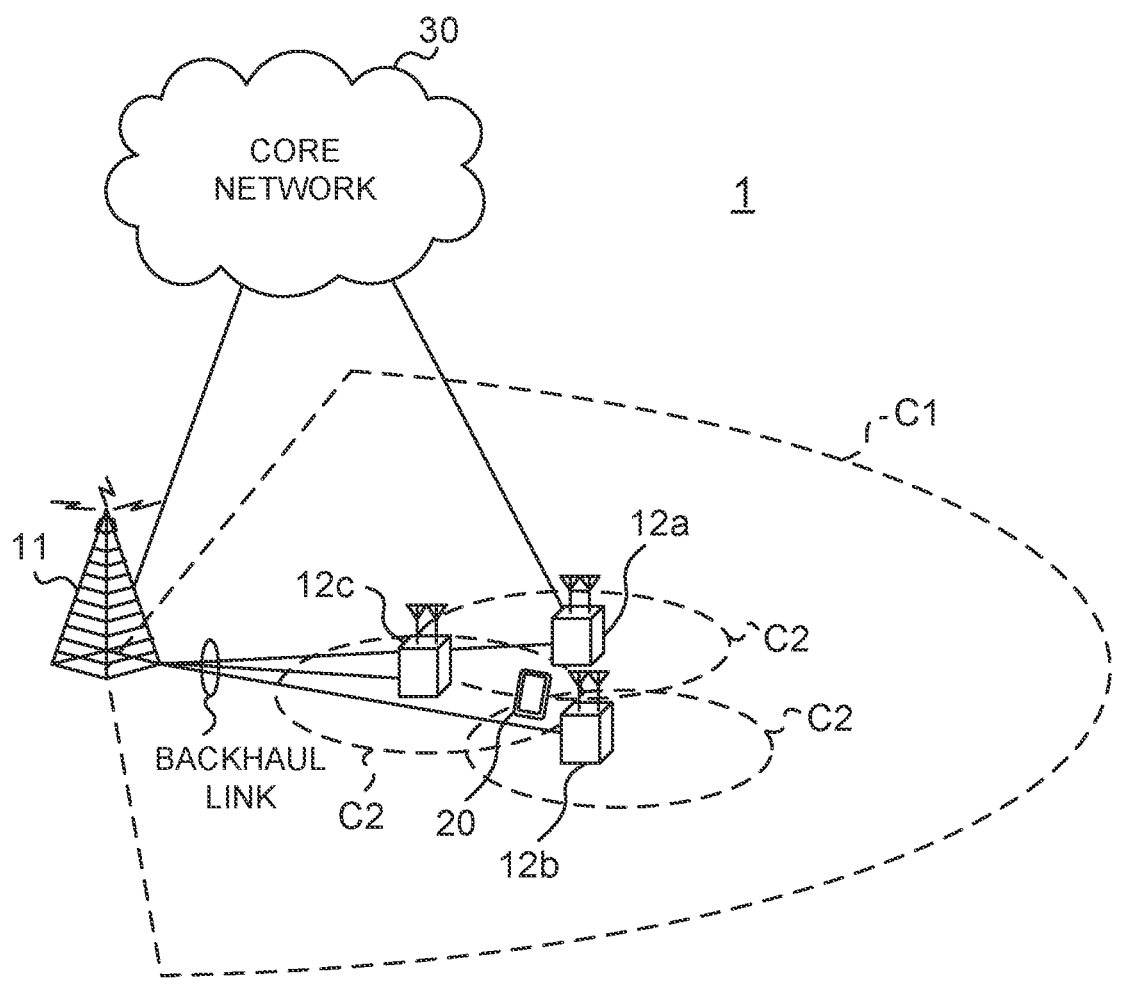
FIG. 19 is a diagram to show an example of a schematic structure of a radio communication system according to one embodiment.

FIG. 19 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 20:
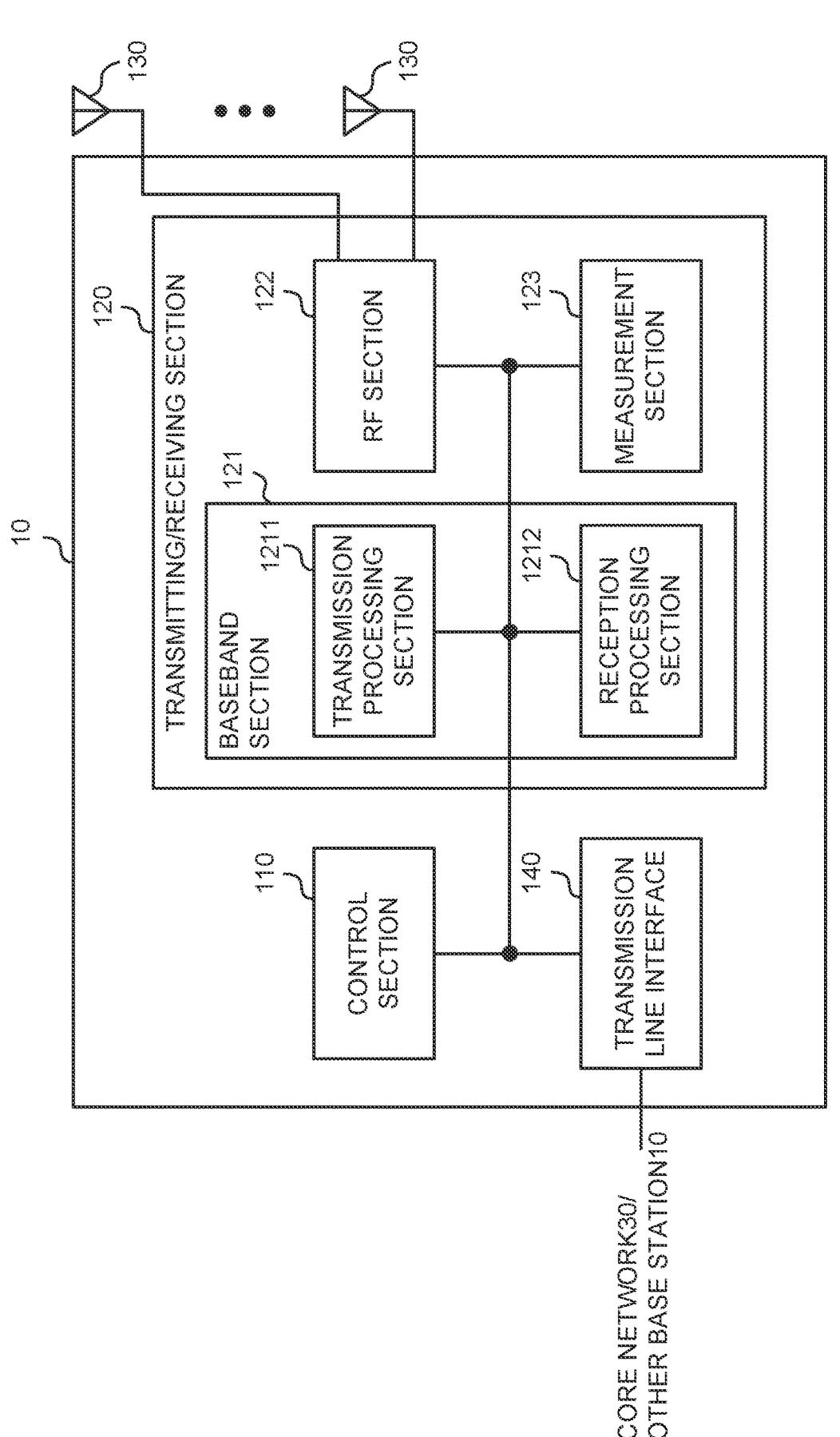
FIG. 20 is a diagram to show an example of a structure of a base station according to one embodiment.

FIG. 20 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, this example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, a configuration for two physical downlink control channels (PDCCHs) linked with each other. The configuration may be at least one of information of linking (association) of two SS sets, information of two linked CORESETs, information of two linked PDCCH candidates in two SS sets, and the like.

The transmitting/receiving section 120 may receive HARQ-ACK information included in an HARQ-ACK codebook determined by the terminal with a Hybrid Automatic Repeat reQuest ACKnowledgement (HARQ-ACK) corresponding to a reference PDCCH candidate of the two PDCCH candidates as valid HARQ-ACK information.

The control section 110 may generate information of a downlink assignment index (DAI) included in downlink control information transmitted by using the two PDCCH candidates to indicate the DAI corresponding to the reference PDCCH candidate of the two PDCCH candidates.

The transmitting/receiving section 120 may receive uplink control information (UCI, for example, HARQ-ACK) transmitted by using an uplink control channel resource (PUCCH resource) determined based on downlink control information, when downlink control information transmitted by using the two PDCCH candidates correspond to a reference PDCCH candidate of the two PDCCH candidates.

The control section 110 may assume that an uplink control channel (PUCCH) and an uplink shared channel (PUSCH) triggered by downlink control information (DCI) detected in a reference PDCCH candidate of the two PDCCH candidates are restricted by simultaneous transmission of another uplink control channel and another uplink shared channel (scheduling of PUCCHs/PUSCHs may be performed so as to avoid such simultaneous transmission).

(User Terminal)

Figure 21:
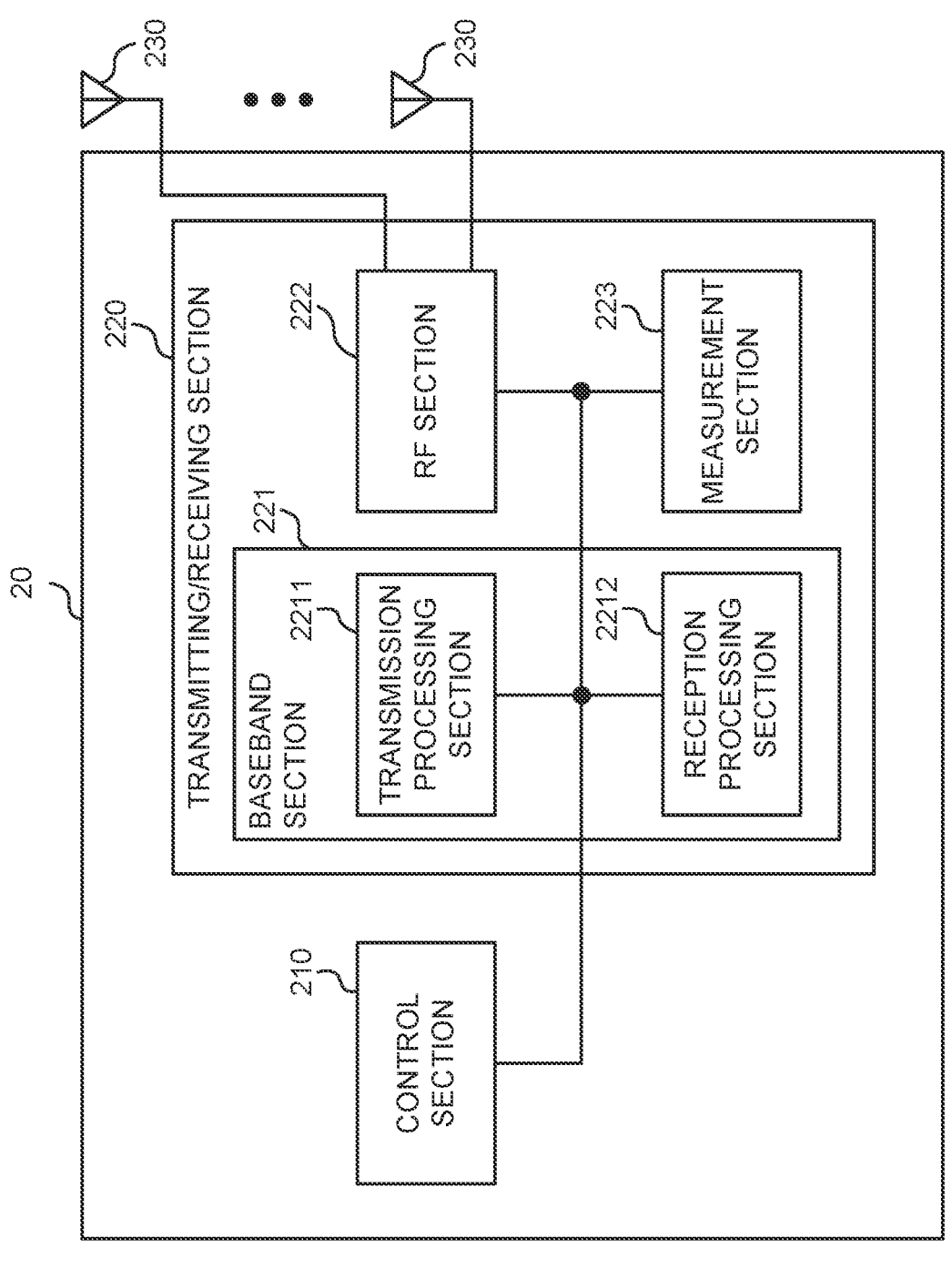
FIG. 21 is a diagram to show an example of a structure of a user terminal according to one embodiment.

FIG. 21 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, this example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a configuration for two physical downlink control channels (PDCCHs) linked with each other. The configuration may be at least one of information of linking (association) of two SS sets, information of two linked CORESETs, information of two linked PDCCH candidates in two SS sets, and the like.

The control section 210 may determine a Hybrid Automatic Repeat reQuest ACKnowledgement (HARQ-ACK) codebook with an HARQ-ACK corresponding to a reference PDCCH candidate of the two PDCCH candidates as valid HARQ-ACK information.

The control section 210 may assume that information of downlink assignment indices (DAIs) (DAI field, C-DAI, T-DAI, and the like) included in downlink control information (DCI) transmitted by using the two PDCCH candidates to indicate the DAI corresponding to the reference PDCCH candidate of the two PDCCH candidates.

The control section 210 may use, when downlink control information transmitted by using the two PDCCH candidates corresponds to a reference PDCCH candidate of the two PDCCH candidates, the downlink control information for uplink control channel resource determination.

The control section 210 may assume that an uplink control channel (PUCCH) and an uplink shared channel (PUSCH) triggered by downlink control information detected in a reference PDCCH candidate of the two PDCCH candidates are restricted by simultaneous transmission of another uplink control channel and another uplink shared channel (overlapping in terms of time).

The reference PDCCH candidate may be a PDCCH candidate of a control resource set (CORESET) for which no CORESET pool index is provided or a CORESET pool index value=0 is provided.

The reference PDCCH candidate may be a PDCCH candidate of a control resource set (CORESET) for which a CORESET pool index value=1 is provided.

The reference PDCCH candidate may be a PDCCH candidate with an earlier PDCCH monitoring occasion among the two PDCCH candidates.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 22:
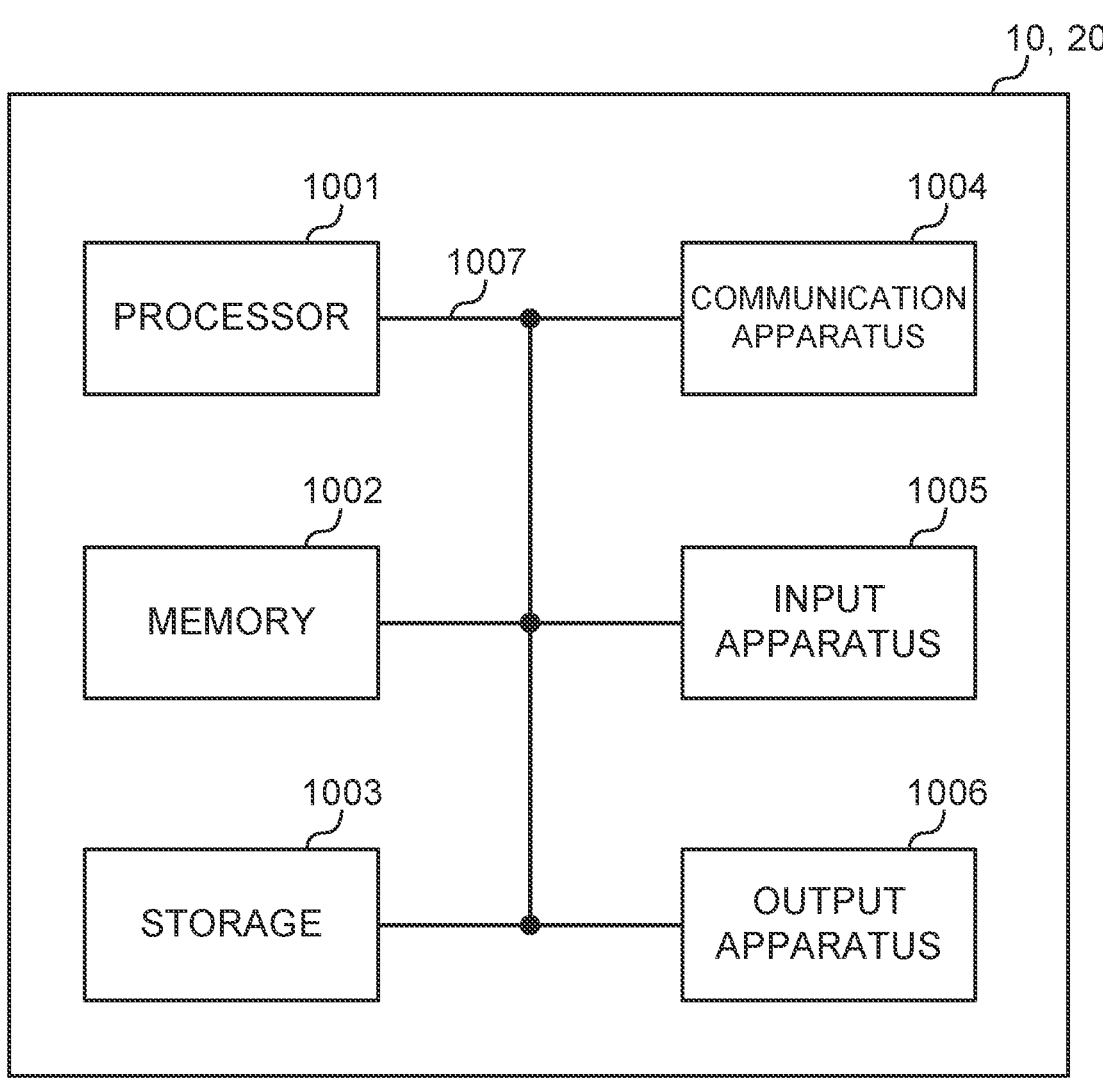
FIG. 22 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 22 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives, via mutually linked search spaces associated with two control resource sets (CORESETs), physical downlink control channels (PDCCHs) that are repeatedly transmitted and used for triggering a physical uplink control channel (PUCCH) transmission, and receives a configuration for two PDCCH candidates that are mutually linked and are PDCCH candidates in the mutually linked search spaces; and a processor that uses, when downlink control information transmitted by using the two PDCCH candidates corresponds to a reference PDCCH candidate of the two PDCCH candidates, the downlink control information for PUCCH resource determination, wherein the two CORESETs that are mutually linked are provided with mutually different CORESET pool indices, and the reference PDCCH candidate is a PDCCH candidate of a CORESET for which a CORESET pool index value=0 or CORESET pool index value=1 is provided.

2. The terminal according to claim 1, wherein a same number of PDCCH candidates are configured for each aggregation level for the mutually linked search space sets.

3. A radio communication method for a terminal, the radio communication method comprising:

receiving, via mutually linked search spaces associated with two control resource sets (CORESETs), physical downlink control channels (PDCCHs) that are repeatedly transmitted and used for triggering a physical uplink control channel (PUCCH) transmission, receiving a configuration for two PDCCH candidates that are mutually linked and are PDCCH candidates in the mutually linked search spaces; and using, when downlink control information transmitted by using the two PDCCH candidates corresponds to a reference PDCCH candidate of the two PDCCH candidates, the downlink control information for PUCCH resource determination, wherein the two CORESETs that are mutually linked are provided with mutually different CORESET pool indices, and the reference PDCCH candidate is a PDCCH candidate of a CORESET for which a CORESET pool index value=0 or CORESET pool index value=1 is provided.

4. A base station comprising:

a transmitter that transmits, via mutually linked search spaces associated with two control resource sets (CORESETs), physical downlink control channels (PDCCHs) that are repeatedly transmitted and used for triggering a physical uplink control channel (PUCCH) transmission, and transmits a configuration for two PDCCH candidates that are mutually linked and are PDCCH candidates in the mutually linked search spaces; and a processor that uses, when downlink control information transmitted by using the two PDCCH candidates corresponds to a reference PDCCH candidate of the two PDCCH candidates, the downlink control information for PUCCH resource determination, wherein the two CORESETs that are mutually linked are provided with mutually different CORESET pool indices, and the reference PDCCH candidate is a PDCCH candidate of a CORESET for which a CORESET pool index value=0 or CORESET pool index value=1 is provided.

5. A system comprising a terminal and a base station, wherein the terminal comprises:

a receiver that receives, via mutually linked search spaces associated with two control resource sets (CORESETs), physical downlink control channels (PDCCHs) that are repeatedly transmitted and used for triggering a physical uplink control channel (PUCCH) transmission, and receives a configuration for two PDCCH candidates that are mutually linked and are PDCCH candidates in the mutually linked search spaces; and a processor that uses, when downlink control information transmitted by using the two PDCCH candidates corresponds to a reference PDCCH candidate of the two PDCCH candidates, the downlink control information for PUCCH resource determination, wherein the two CORESETs that are mutually linked are provided with mutually different CORESET pool indices, and the reference PDCCH candidate is a PDCCH candidate of a CORESET for which a CORESET pool index value=0 or CORESET pool index value=1 is provided, and the base station comprises:

a transmitter that transmits the PDCCHs and the configuration.

* * * * *